US012796655B2

(12) United States Patent
Diedrichsen

(10) Patent No.: US 12,796,655 B2
(45) Date of Patent: Nov. 17, 2026

(54) ANIMAL DRINK DISPENSER APPARATUS AND SYSTEM

(71) Applicant: Erik Joseph Diedrichsen, West Bridgewater, MA (US)

(72) Inventor: Erik Joseph Diedrichsen, West Bridgewater, MA (US)

( * ) Notice: Subject to any disclaimer, the term of this patent is extended or adjusted under 35 U.S.C. 154(b) by 0 days.

(21) Appl. No.: 19/189,190

(22) Filed: Apr. 24, 2025

(65) Prior Publication Data

US 2025/0248366 A1 Aug. 7, 2025

Related U.S. Application Data

(63) Continuation-in-part of application No. 18/451,357, filed on Aug. 17, 2023, which is a continuation-in-part of application No. 29/870,717, filed on Feb. 2, 2023, now Pat. No. Des. 1,030,154, and a continuation-in-part of application No. 29/870,714, filed on Feb. 2, 2023, now abandoned, and a continuation-in-part of application No. 29/870,715, filed on Feb. 2, 2023.

(51) Int. Cl.
*A01K 7/02* (2006.01)

(52) U.S. Cl.
CPC .................................... *A01K 7/025* (2013.01)

(58) Field of Classification Search
CPC ............. A01K 7/00; A01K 7/02; A01K 7/025
See application file for complete search history.

(56) References Cited

U.S. PATENT DOCUMENTS

| | | | | |
|---|---|---|---|---|
| 1,359,852 A * | 11/1920 | Wickstrom | A01K 7/025 | 119/73 |
| 1,608,346 A * | 11/1926 | Stifle | A01K 7/025 | 119/77 |
| 3,112,733 A * | 12/1963 | Arnott | A01K 7/02 | 119/77 |
| 4,274,365 A * | 6/1981 | Peters | A01K 7/04 | 137/426 |
| 8,800,494 B2 * | 8/2014 | Lipscomb | B01D 35/30 | 119/74 |
| 8,826,859 B1 * | 9/2014 | Slinkard | A01K 7/04 | 119/80 |
| 11,122,773 B2 * | 9/2021 | Moretto | A01K 7/02 | |
| 2020/0045940 A1 * | 2/2020 | Slinkard | A01K 39/024 | |

* cited by examiner

*Primary Examiner* — Marisa V Conlon
(74) *Attorney, Agent, or Firm* — Wilson Dutra, PLLC; Camille A. Wilson

(57) ABSTRACT

The present disclosure provides an animal drink dispenser apparatus. In some embodiments, the animal drink dispenser apparatus may be configured to attach to a housing capable of storing a volume of fluid. In some aspects, the animal drink dispenser may include a substantially rigid, circular structure. In some implementations, the animal drink dispenser apparatus may include an interior facing side and an exterior facing side, a bottom tray, a liquid inlet, and a vent apparatus.

18 Claims, 40 Drawing Sheets

3300

3400

ANIMAL DRINK DISPENSER APPARATUS AND SYSTEM

CROSS-REFERENCE TO RELATED APPLICATION

This application is a continuation-in-part of claims priority to and the full benefit of pending U.S. Nonprovisional application Ser. No. 18/451,357 (filed Aug. 17, 2023, and titled "Animal Watering Apparatus and System"), the entire contents of which are incorporated in this application by reference, which claimed priority to and the full benefit of U.S. Design Ser. No. 29/870,717 (filed Feb. 2, 2023, and titled "COMPONENT OF ANIMAL WATERING APPARATUS"; currently patented D1030154), the entire contents of which are incorporated in this application by reference, which claimed priority to and the full benefit of U.S. Design Ser. No. 29/870,715 (filed Feb. 2, 2023, and titled "COMPONENT OF ANIMAL WATERING APPARATUS"), the entire contents of which are incorporated in this application by reference, which claimed priority to and the full benefit of U.S. Design Ser. No. 29/870,714 (filed Feb. 2, 2023, and titled "COMPONENT OF ANIMAL WATERING APPARATUS"), the entire contents of which are incorporated in this application by reference.

BACKGROUND

Traditionally, waterers have been used to provide a supply of fresh water to farm animals. Often times, these waterers include large tanks configured to dispense the fresh water to farm animals. For larger farm animals, such as cattle and horses, waterers are larger and include tanks that may hold up to 120-180 gallons. These waterers may be concrete, stainless steel, or fiberglass. For smaller farm animals, such as poultry, waterers may be smaller and require lower volumes of water.

The problems that are associated with typical waterer devices include contamination, difficulty of access, high maintenance, and difficulty in refilling the water supply. Specifically, both large and small tanks are susceptible to dirt, bacteria, and debris accumulation, which may lead to contamination of the waterer and its fresh water supply. Moreover, the farm animals themselves introduce feed, saliva, and other contaminants into the water which may compromise its cleanliness.

Maintenance is another issue for these traditional waterers. Due to their size, the number of farm animals using the waterers, and environmental factors, the waterers require frequent cleanings to prevent build-up and contamination. Many of these waterers are difficult to clean and may require disassembly to properly eliminate contamination and build-up. Moreover, failure to maintain them properly may increase costs as parts may become damages or broken or the waterer may need to be replaced entirely.

The process of refilling traditional waterers may also require intense labor, especially as the waterers increase in size. Transporting large quantities of water may be difficult and the process of refilling the waterers may take long periods of time. In addition, smaller waterers may require multiple refills a day to ensure an adequate supply for farm animals. While these smaller waterers may be easier to fill, the continuous maintenance and refills may consume a lot of a farmer's time and resources.

There is a need for a waterer device that mitigates the issues with traditional waters by reducing the labor and resources required to maintain and refill the waterer device. Specifically, if there were a device that was able to clean and automatically refill itself, this may reduce the labor and resources required to upkeep the waterers for farm animals.

SUMMARY OF THE DISCLOSURE

In accordance with the various embodiments of the present invention, and to address the aforementioned problems, there is provided a gravity-induced automatic animal drink dispenser device that promotes increased sanitation and minimizes the amount of work required to provide a supply of fresh drinking water to animals, without any moving parts.

More specifically, an apparatus for storing and supplying a regulated amount of liquids, such as drinking water, is provided. The apparatus in its most general description comprises: a housing defining an interior volume adapted to store a supply of liquids, a bottom tray releasably attachable to a bottom of the housing, the bottom tray member having a drinking trough associated therewith. The bottom tray defines a wall which fluidly separates the supply of drinking water in the interior volume from the trough. At least one passageway is defined in the wall for fluidly communicating the liquids in the interior volume with the trough. A vent apparatus disposed within the interior volume fluidly communicates a volume of air above the liquids in the housing, which is reduced when said liquids are dispensed, with the ambient air to equalize pressure therebetween. Animals may consume liquids from the trough of the animal drink dispenser apparatus whereby the housing is caused to further dispense said liquids into said trough.

The vent apparatus may include a one-way valve that allows ambient air to enter and equalize pressure in the volume of air above the liquids therewith when the pressure inside said volume of air falls below a predetermined threshold. Alternatively, the vent apparatus may include a vent tube having an open upper end disposed inside the volume of air inside the housing, and an open lower end on the wall or in proximity to the trough. The lower end of the vent tube reversibly submerged into the liquids flowing through the passageway to the trough such that said vent tube fluidly communicates the ambient air to the volume of air in the housing to equalize pressure therebetween when the liquids in the trough is consumed whereby the liquid levels in the trough drop and cause the open lower end to reemerge from said liquid.

In some embodiments, the lower end is adjustably positioned at a desired distance from the bottom of the trough to maintain a desired volume of the liquids dispensed to said trough. By equalizing pressure in the volume of air in the housing, gravity induces the housing to resume dispensing liquids into the trough without impedance of negative pressure in the volume of air. Correspondingly, the vent apparatus allows the volume of air in the housing to be pushed out therethrough to the ambient air when said housing is being refilled by the liquid inlet such that the volume of air is prevented from pressurizing.

At least one passageway defined on the wall of the bottom tray for fluidly communicating the liquids in the interior volume with the trough. In some embodiments, a single passageway is defined on the bottom tray. In other embodiments, more than one passageway is defined on the bottom tray.

In an alternative embodiment, an animal drink dispenser apparatus may comprise a housing defining an interior volume adapted to store a supply of liquids, a bottom tray releasably attachable to a bottom of the housing defining a trough, and a passageway, defined by the bottom tray, fluidly communicating the interior volume of the housing with the trough by force of gravity. The passageway may be defined in proximity to an end of the trough. A vent apparatus may be adapted to equalize a pressure in a volume of air above the liquid in the housing, which is reduced when said liquid is dispensed to the trough, with the ambient air.

In another alternative embodiment, an animal drink dispenser apparatus comprises: a housing defining an interior volume adapted to store a supply of liquids, a bottom tray releasably attachable to a bottom of the housing defining a trough, wherein at least one portion of the trough has a concaving contour, and one or more passageways, defined by the bottom tray, fluidly communicating the interior volume of the housing with the trough by force of gravity. At least one of the passageways may be defined in proximity to the at least one portion such that obstructions are prevented from blocking said passageways. A vent apparatus adapted to equalize a pressure in a volume of air above the liquids in the housing, which is reduced when said liquids are dispensed to the trough, communicates the volume of air above the liquids with the ambient. The vent apparatus may be seated on the passageway in proximity to the at least one portion such that the vent apparatus fluidly communicates the ambient air into the volume of air based on a level of the liquid in the at least one portion of the trough.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

Figure 1A:
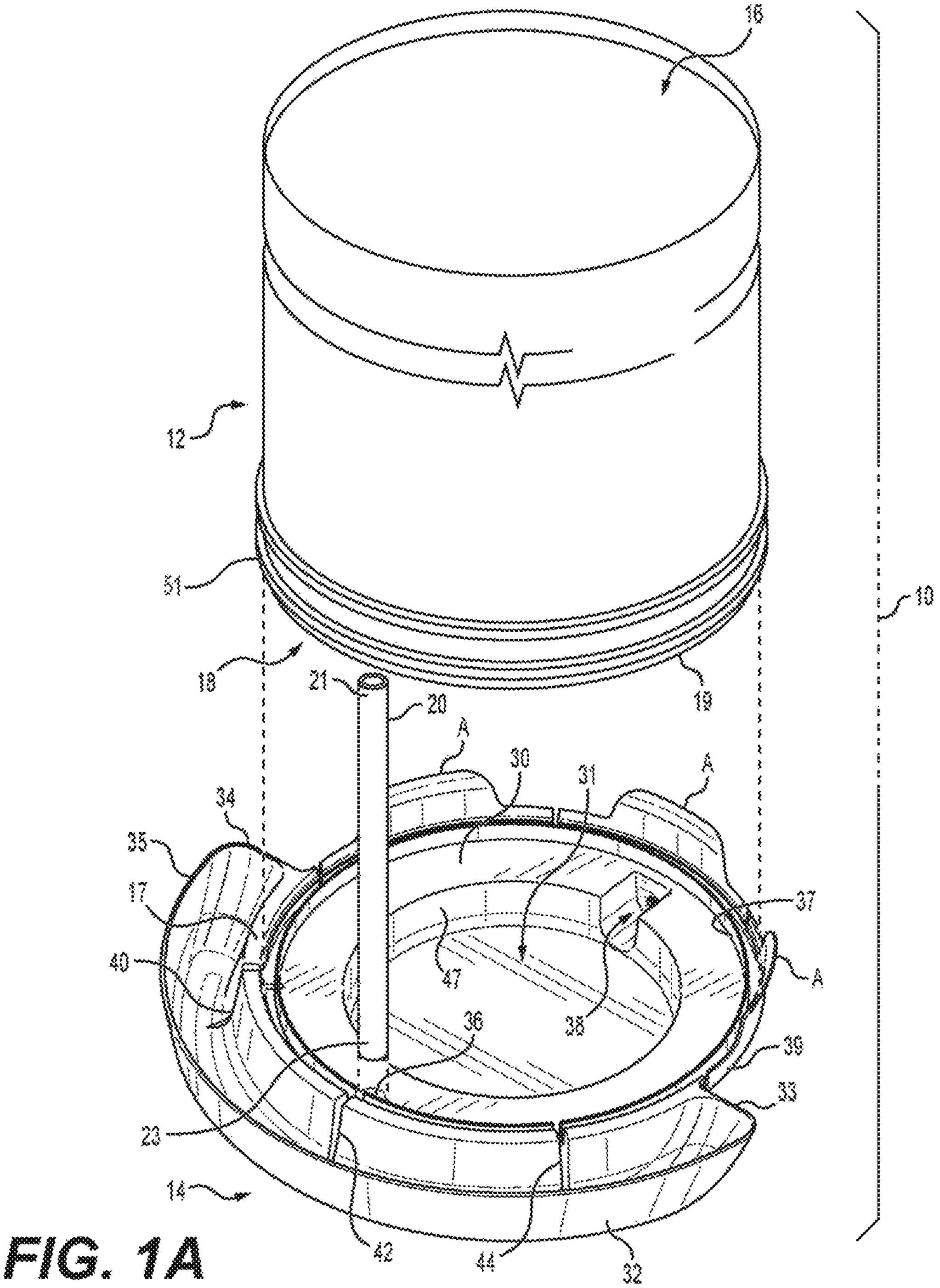
FIGS. 1A-1C depict left front perspective exploded view of an embodiment of an animal drink dispenser apparatus, according to some embodiments of the present disclosure.

The Figures are not necessarily drawn to scale, as their dimensions can be varied considerably without departing from the scope of the present disclosure.

DETAILED DESCRIPTION

The following description is of a preferred and other embodiments presently contemplated for carrying out the disclosure. This description is not to be taken in a limiting sense, but is made merely for the purpose of describing one or more embodiments of the disclosure. The scope of the disclosure should be determined with reference to the accompanying claims.

As used herein, "substantially" means largely or considerably, but not necessarily wholly, that is sufficient to work for the intended purpose. The term "substantially" thus allows for minor, insignificant variations from an absolute or perfect state, dimension, measurement, result, or the like as would be expected by a person of ordinary skill in the art, but that do not appreciably affect overall performance.

An apparatus for storing and supplying a regulated amount of liquids is provided. In certain embodiments, for example the embodiment shown in FIGS. 1-10, a drink dispenser apparatus 10 comprises: a housing 12 defining a hollow interior volume adapted to store a supply of liquids, and a bottom tray 14 releasably attachable to a bottom, such as a bottom edge 19, of the housing 12, the bottom tray 14 defining a trough 32. At least one passageway is defined on the bottom tray 14 for fluidly communicating the liquids in the interior volume of the housing 12 with the trough 32. In some embodiments, it is contemplated that only a single passageway, such as passageway 42, be employed. In other embodiments, the bottom tray 14 may have more than one passageway, such as passageways 40, 42, and/or 44. A vent apparatus, such as one or more vent tubes 20, fluidly communicate a volume of air V above a liquid supply W stored in the interior volume of the housing 12. The vent apparatus equalizes the pressure in the volume of air V, which is reduced, when said liquids are dispensed to the trough 32, with the ambient air. In the embodiment shown, a single vent tube 20 is associated with one of the passageways; however, additional vent tubes may be employed associated with other passageways 40, 42, and/or 44.

In some embodiments, the bottom tray 14 may be indicative of a snap-fitting tray similar to that used in connection with a standard 5-gallon bucket adapted to be removably connected to an upper edge of the housing 12, and the trough 32 associated with the bottom tray 14 may be adapted to hold an exposed supply of liquids for animals to drink. Liquids supplied by the apparatus 10 may include, but not be limited to, drinking water, juices, milk, liquidized fodder, nutritional supplements, medicines, and the like.

Figure 2:
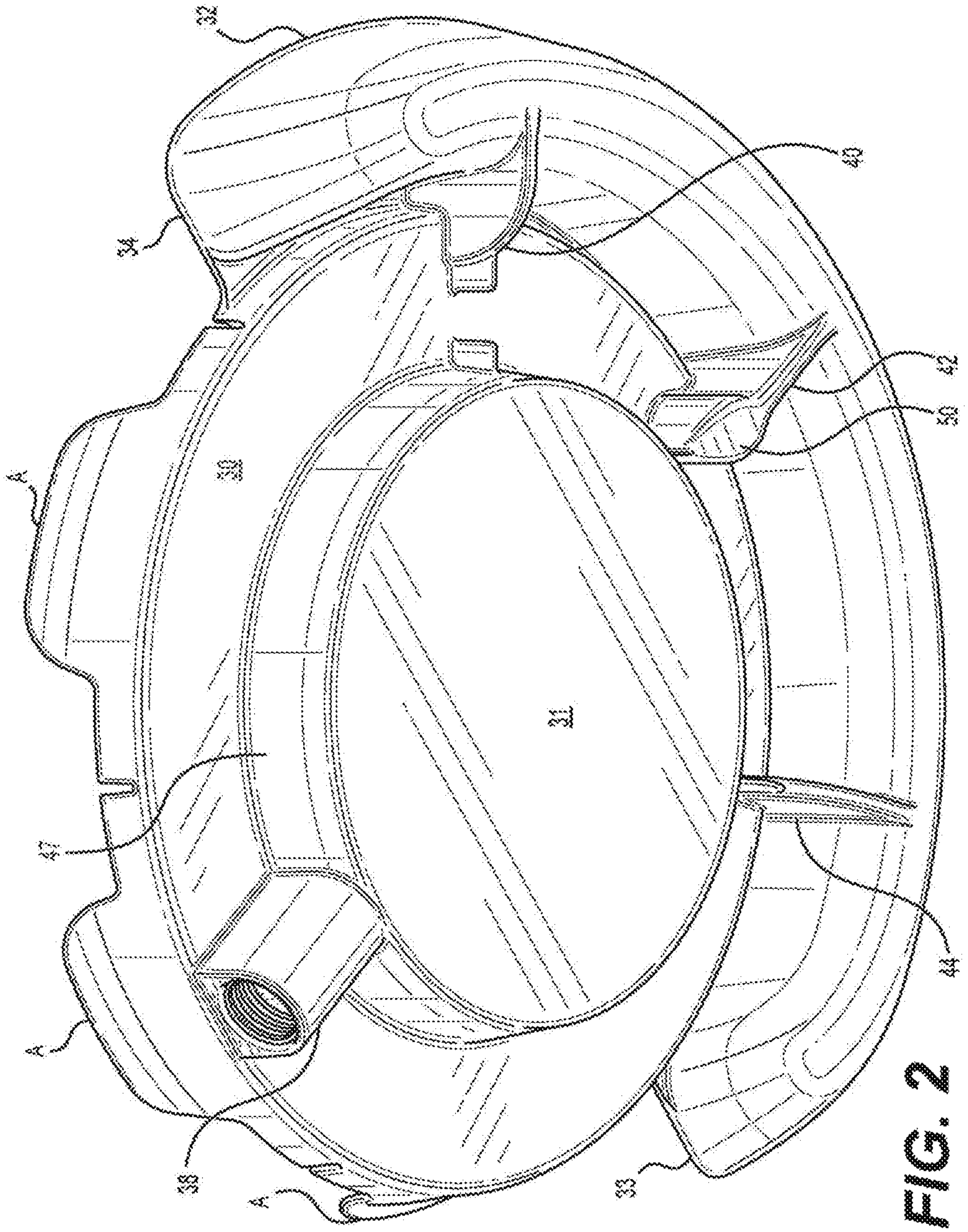
FIG. 2 illustrates a bottom left perspective view of a bottom tray of an animal drink dispenser apparatus, according to some embodiments of the present disclosure.
Figure 3:
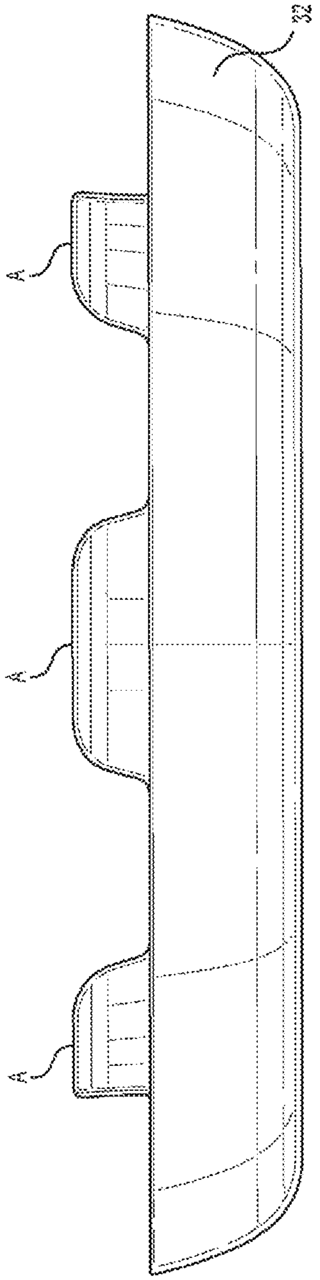
FIG. 3 illustrates a front elevational view of an animal drink dispenser apparatus, according to some embodiments of the present disclosure.
Figure 4:
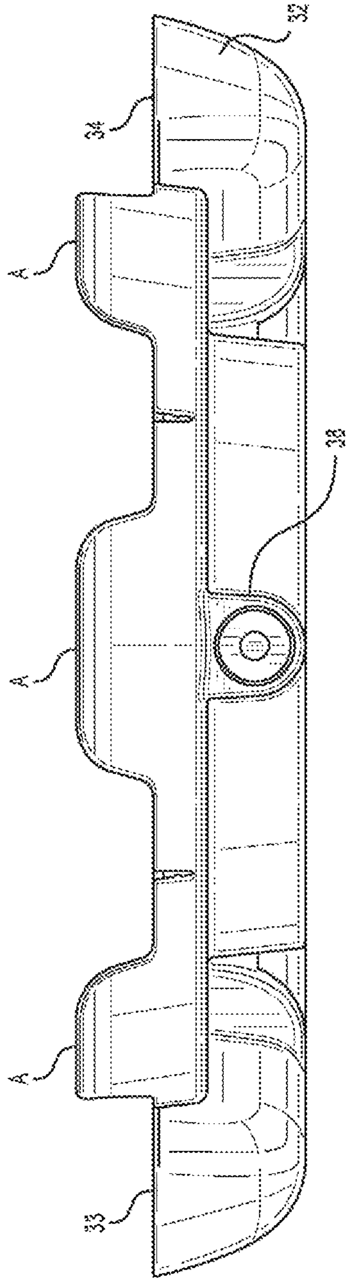
FIG. 4 illustrates a rear elevational view of an animal drink dispenser apparatus, according to some embodiments of the present disclosure.
Figure 5:
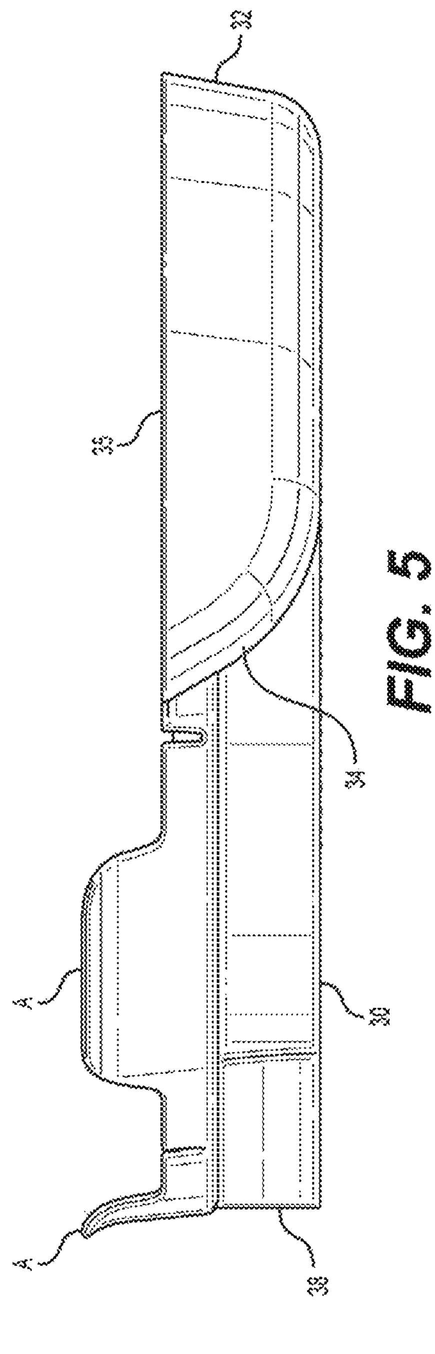
FIG. 5 illustrates a right-side elevational view of an animal drink dispenser apparatus, according to some embodiments of the present disclosure.
Figure 6:
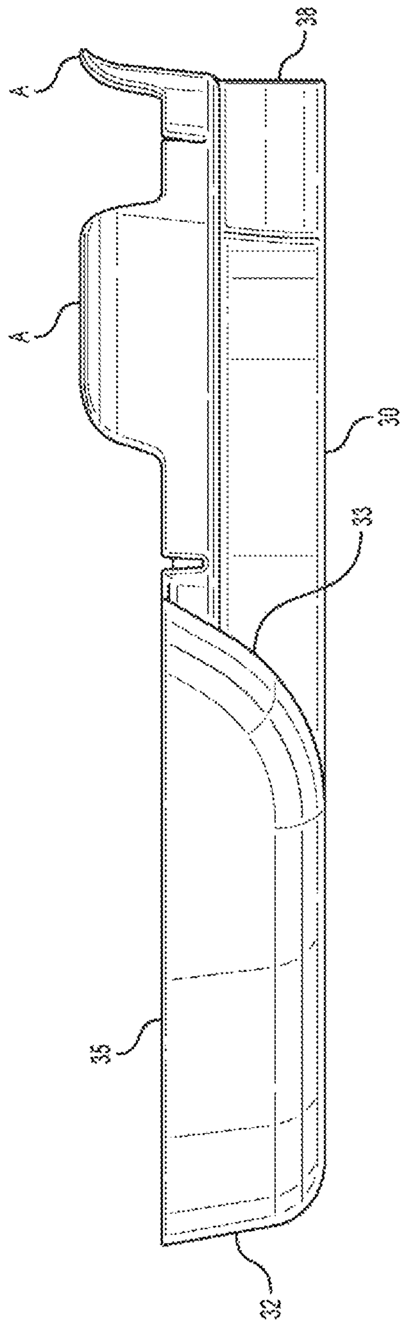
FIG. 6 illustrates a left-side elevational view of an animal drink dispenser apparatus, according to some embodiments of the present disclosure.
Figure 7:
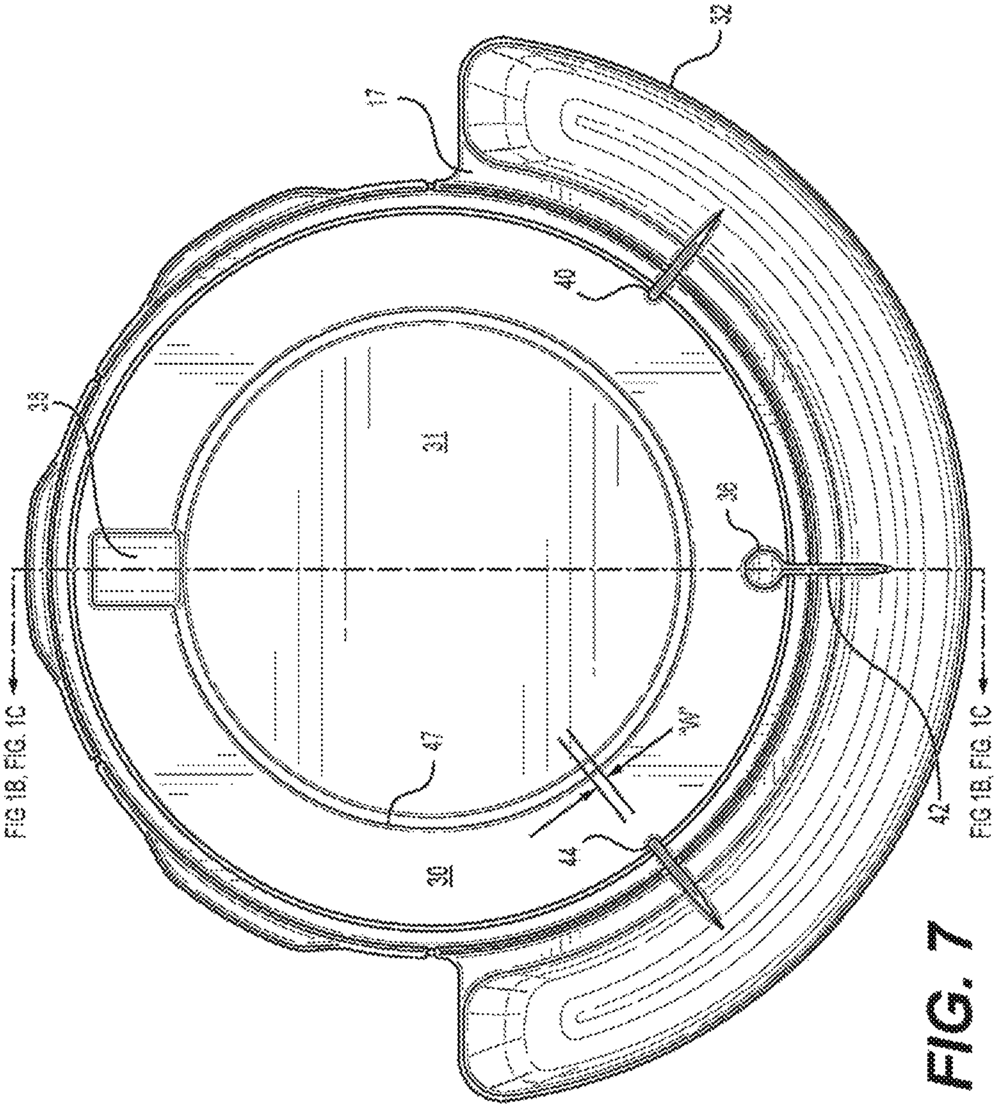
FIG. 7 illustrates a top view of an animal drink dispenser apparatus, according to some embodiments of the present disclosure.

The bottom tray 14 defines opposed, concentric inner and outer ridges 37 and 39, respectively, adapted to mate with a corresponding bottom edge 19 defining an open bottom of housing 12. The bottom tray 14 may be secured to the housing 12 by fitting the bottom edge 19 between the inner ridge 37 and the outer ridge 39. The ridges 37, 39 may be defined along a perimeter of a support surface 30 on the bottom tray 14. The support surface 30 is adapted to support the liquids stored in the interior volume of the housing 12. In some embodiments, the support surface 30 may have a substantially circular contour, and the ridges 37, 39 may be configured along the circumference of said support surface 30, as shown in FIGS. 1A and 2. Contours and dimensions of the ridges 37, 39 may be suitably adapted based on shape and dimensions of the housing 12, base 14 and the support surface 30. One or more passageways 40, 42, or 44 may be defined by wall 17 to allow water to be dispensed therethrough. The wall 17 is adapted to prevent liquids from flowing into the trough 32, except through any of the one or more passageways 40, 42, or 44.

The housing 12 may comprise any suitable receptacle for holding a supply of liquids. In some embodiments, the housing 12 may be configured similarly to a 5-gallon bucket, and relevant portions of the bottom tray 14 configured similarly to a removable lid to a 5-gallon bucket In some embodiments, the housing 12 may have a substantially cylindrical profile. In other embodiments, the housing 12 may have a cuboidal profile. The housing 12 may be suitably adapted to have any contours or dimensions. Contours of the bottom tray 14 may correspond to the contours of the housing 12. In some embodiments, the contours of the bottom tray 14 may correspond to the contours of the bottom edge 19 of the housing 12. It is to be understood that the bottom tray 14 is intended to be substantially sealed to the housing 12 to retain the supply of liquids within the interior volume thereof, to prevent the liquid from leaking from between said bottom tray 14 and the housing 12.

The bottom tray 14 may be removably connectable to the bottom of the housing 12, or may be permanently attached thereto. In embodiments where the bottom tray 14 is permanently attached to the housing 12, the bottom tray 14 and the housing 12 may be manufactured as a single piece, or may be permanently connected thereto by means of adhesive, welding or otherwise bonding the bottom tray 14 to the housing 12. In embodiments where the bottom tray 14 is removably connectable to the bottom of the housing 12, the bottom tray 14 may be connected to the housing 12 by means of including, but not limited to, screws, nails, rivets, hook and loop fasteners, hook and slot fasteners, interlocking structures engageably configured therebetween, magnetic elements, and the like. In some embodiments, structure for removably (or permanently, if desired) connecting the bottom tray 14 with the bottom edge 19 of the housing 12 may be preferred. Lower end wail 18 of housing 12 indicative of area within the bottom edge 19 may be correspondingly contoured to allow connection with the bottom tray 14. In some embodiments, one or more resilient tabs "A" extending from the outer ridge 39 of the bottom tray 14 may permit the partial release of the interlocking engagement of lip 49 defined by wall 39 and lip 51 that extends from the bottom end 19 of the housing 12, as shown in FIGS. 1-5.

In some embodiments, the trough 32 may have a substantially annular contour, where said trough 32 is configured along a perimeter of wall 17 of bottom tray 14. In some embodiments, the trough 32 may be defined with a substantially U-shaped cross-sectional contour for receiving liquid from the housing 12, and allowing one or more animals to drink liquid therefrom. The trough 32 may be configured fully or partially along the perimeter of the bottom tray 14. In embodiments shown in FIGS. 2, 7, and 8, the trough 32 is defined half-way around the perimeter of bottom tray 14. In other embodiments, the contours and dimensions of the trough 32 may be suitably adapted based on factors including, but not limited to, body structure, drinking requirements, and the like, of the animals for which the apparatus 10 is intended. In some embodiments, a trough edge 35 is defined on the trough 32 to prevent liquids dispensed into the trough 32 from overflowing. In some embodiments, the trough overflow edge 35 may have a substantially curved contour so as to prevent injuries to animals from contact with otherwise blunt or sharp edges. The trough 32 defines a first end 33 and a second end 34 that, along with the trough edge 35, prevent liquids from spilling out of said trough 32.

The bottom tray 14 defines at least one liquid inlet 38 adapted to fluidly communicate at least one liquid supply source with the housing 12. The liquid inlet 38 may be adapted to introduce liquids into the housing 12. The liquid inlet 38 may be associated with a water supply source such as a municipal water supply to maintain a supply of fresh water in the housing 12. The liquid inlet 38 may be internally threaded to securely engage with the at least one liquid supply source, such as a hose or a tap, having a corresponding threaded portion. In some embodiments, the liquid inlet 38 may be provided on the bottom tray 14, as shown in embodiment of FIGS. 1-10. In such embodiment, the liquids from the at least one supply may be pressurized to force said liquids into the housing 12 such that the liquid moves unidirectionally into said housing 12 against the pressure of the liquid present in the interior volume when the liquid inlet 38 is opened. The liquid inlet 38 may be reversibly sealed once the interior volume is filled with the liquid. In other embodiments, the liquid inlet 38 may be defined at or near an upper end wall 16 of the housing 12. In yet other embodiments, the liquid inlet 38 may be defined on the lateral surface of the housing 12. Alternatively, the housing 12 may be periodically filled with liquid manually. In such embodiments, the upper end wall 16, or a portion or releasable fill cap thereof may be removably configured to the housing 12 to allow for manual refilling. Bottom tray 14 may define a lower volume or area 31 adapted to provide the necessary vertical height for liquid inlet 38. A wall 47 may be employed to define the lower volume or area 31.

Additionally, the housing 12 or bottom tray 14 may be interconnected with one or more other housing(s) 12 or bottom tray(s) 14 to create a multi-faceted drink dispenser system. In some embodiments, each of the one or more housings 12 may be integrally stacked over the other, thereby increasing the interior volume available for holding liquids therein. Other arrangements and configurations of the embodiments disclosed herein are considered to be within the scope of the disclosure.

It is to be appreciated that the interconnection of the housing 12 with the bottom tray 14 may be used to provide structure to fluidly communicate the interior of the housing 12, and, thus, the supply of liquids, to the trough 32. To that end, the bottom tray 14 may be configured to provide one or more passageways 40, 42, and 44, as discussed herein. The passageways 40, 42, and/or 44 are preferably sized and shaped to permit the desired amount and flow rate of liquid from the housing 12 into the trough 32, and to co-act with the vent apparatus (described below) to prevent liquids from overflowing the trough 32. Each of the at least one passageways may be defined to be from about 1⁄16" to about 2" in width, and from about 1" to about 4" in depth. It has been found by experimentation, in certain embodiments, that passageways 40, 42, and/or 44 having a width “W” of between ⅛"-¼" and depth “D” of ¼"-½" work suitably.

Figure 1B:
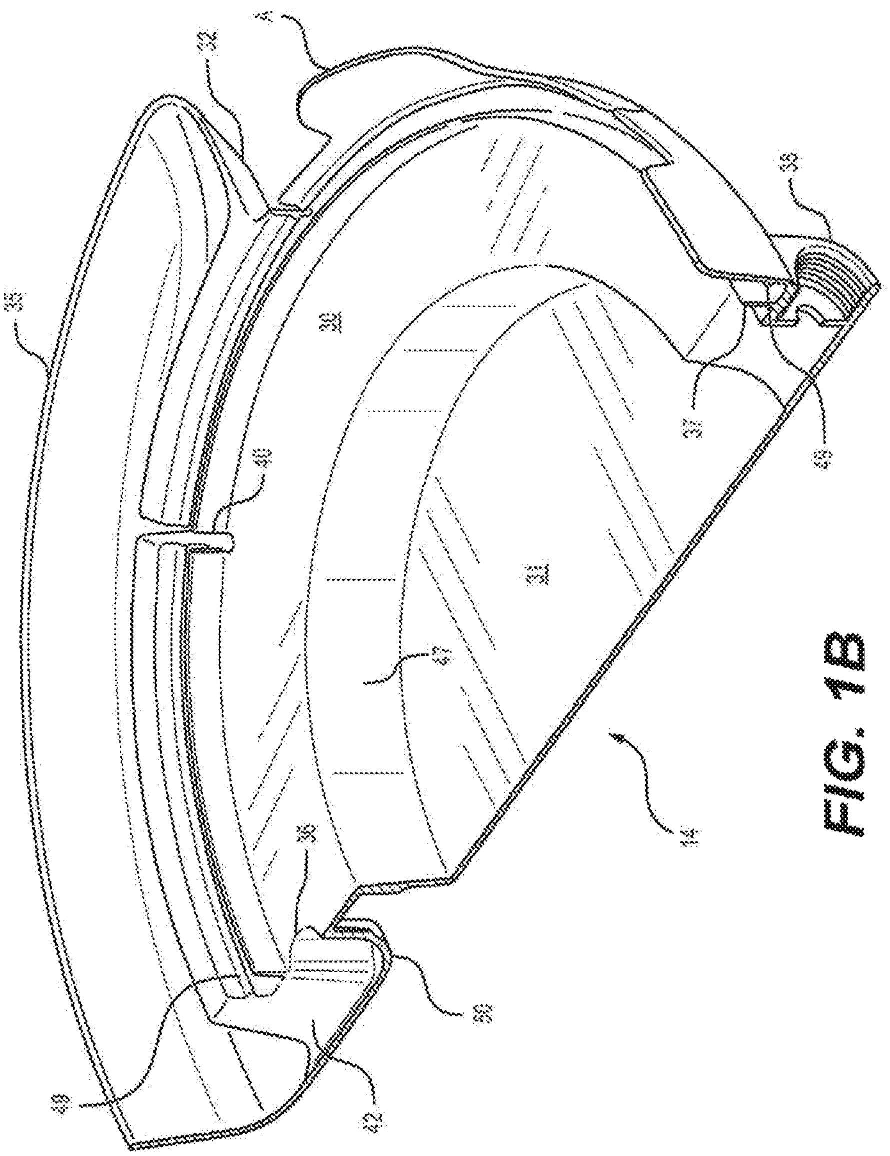
Figure 1C:
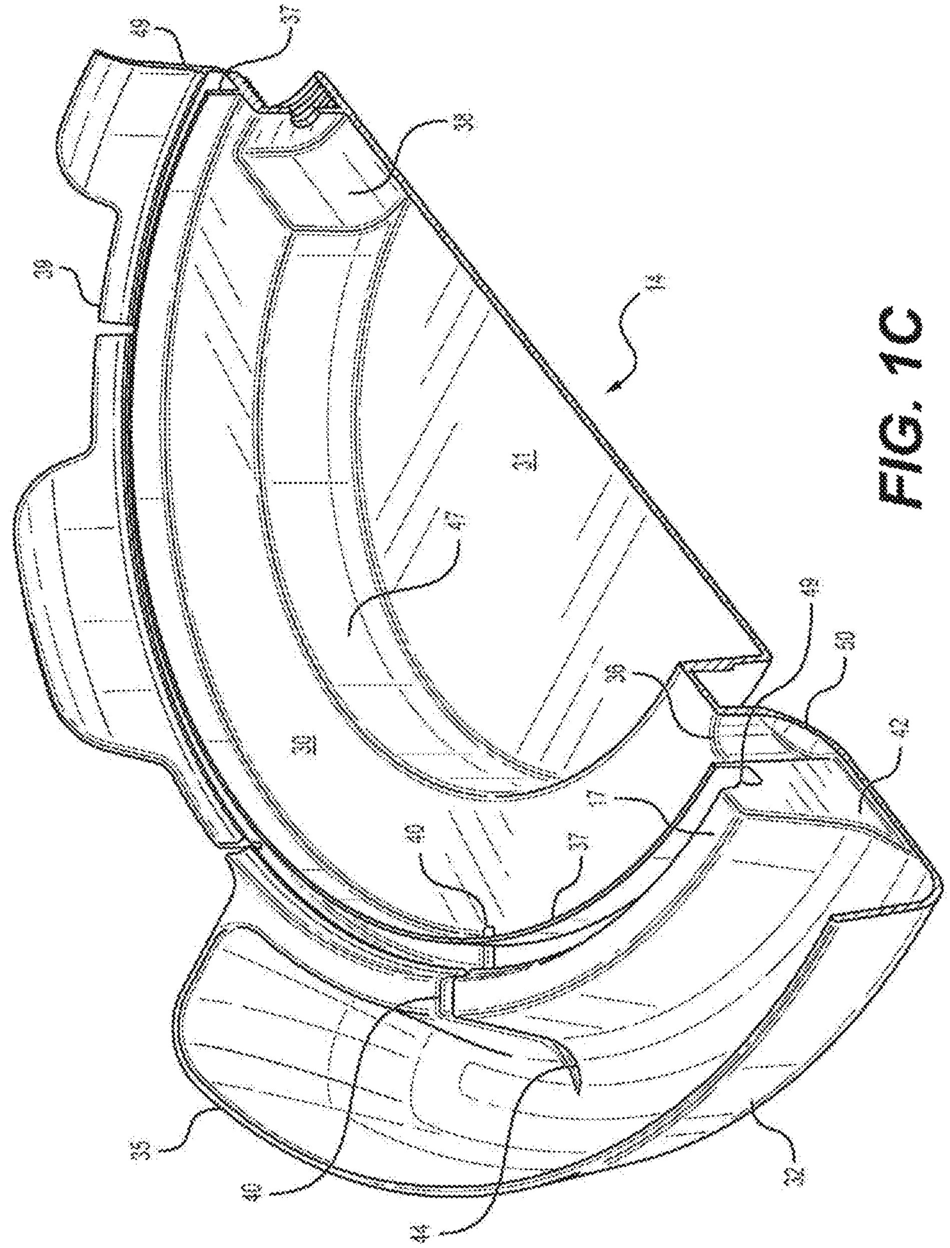
Figure 8:
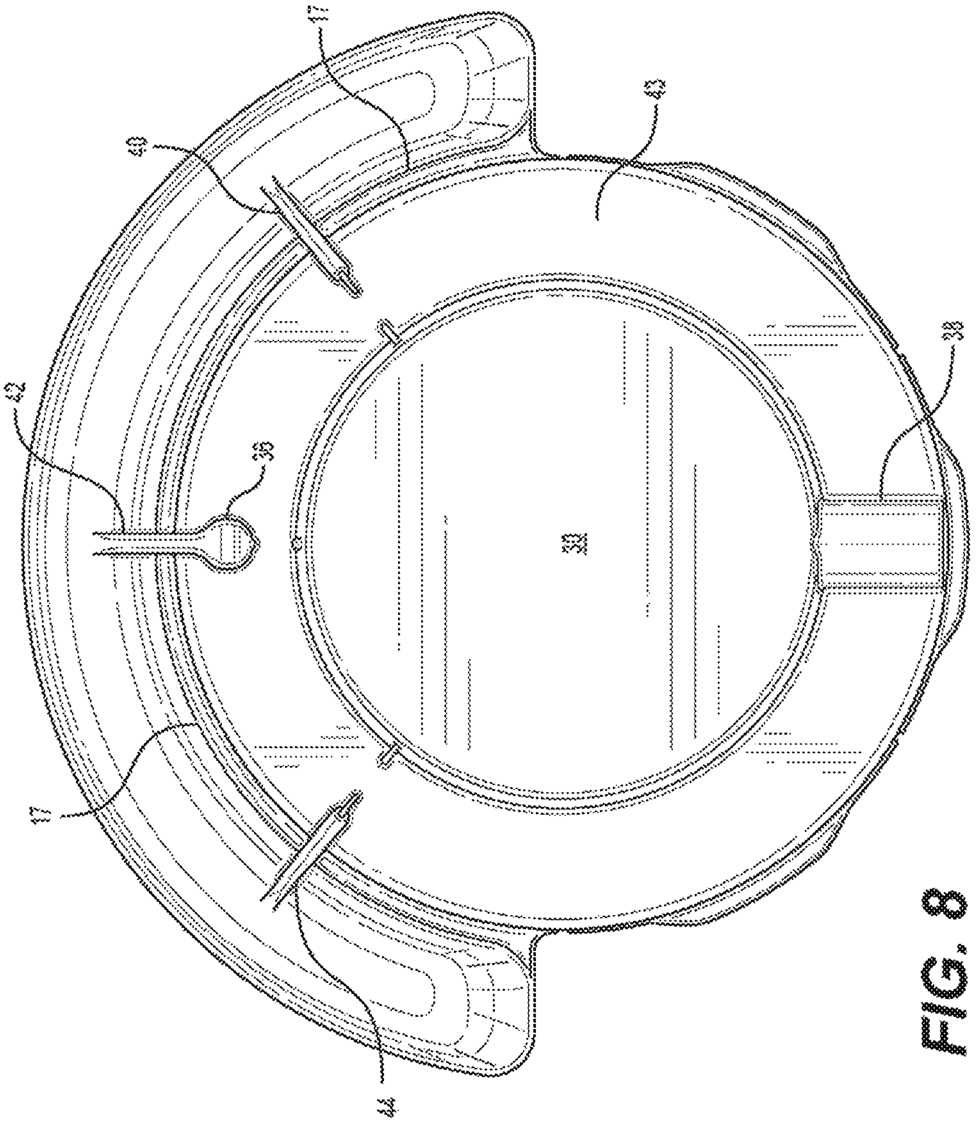
FIG. 8 illustrates bottom view of an animal drink dispenser apparatus, according to some embodiments of the present disclosure.
Figure 9:
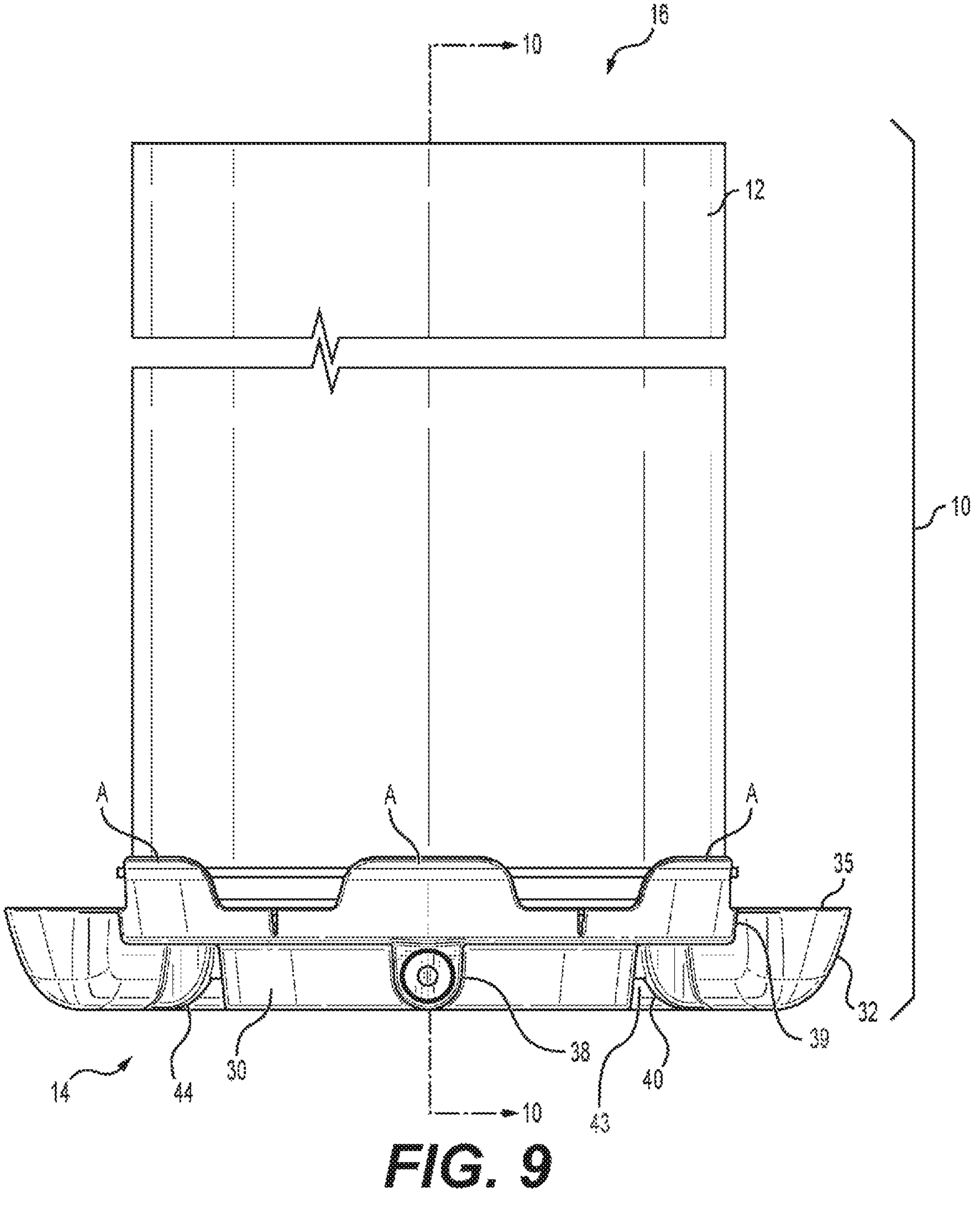
FIG. 9 illustrates an assembled rear elevational view of an embodiment of an animal drink dispenser apparatus, according to some embodiments of the present disclosure.

It is also to be appreciated that dam-like structure, such as wall 17 as shown in FIGS. 1A and 8, may be used to connect the bottom tray 14 to the trough 32. The wall 17 may accommodate one or more passageways, such as channels or passageways 40, 42, and 44. The wall 17 substantially prevents the water over the support surface 30 to flow into the trough 32, except through the one or more passageways such as passageways 40, 42, or 44. The wall 17 may have a substantially annular contour. The wall 17 may also separate the support surface 30 from a bottom surface of the trough 32. FIGS. 1B and 1C provide cross-sectional illustrations of the bottom tray 14 along the indicated lines of FIG. 7. In embodiments shown in FIGS. 1B, 1C, and 8, the wall 17 may have a substantially hollow construction, said hollow construction being characterized by a substantially annular void 43.

It is desirable to equalize the pressure in a volume of air V above the surface of liquids W in the housing 12 to allow for the free or otherwise desired flow of liquids from the interior volume of the housing 12 to the trough 32. Because the volume of air V defined by the upper end wall 16 of the housing 12 and the surface of the liquids (referred to herein as the “chamber”) is sealed, dispensing liquids into the trough 32 may create a reduction in the pressure in the chamber, which in turn may tend to impede further dispensation of liquids into the trough 32 through the passageways 40, 42, and/or 44. The housing 12 is induced to dispense liquids through the passageways 40, 42, and/or 44 defined on the bottom tray 14 into the trough 32 by force of gravity. In some embodiments, consumption of liquids from the trough 32 may cause the liquid level to drop in said trough 32. The one or more passageways 40, 42 and/or 44 may then allow liquids to be dispensed from the housing 12 into the trough 32 to replace the consumed fluids. The more liquid that drains from the housing 12 into the trough 32, the stronger the negative pressure within the chamber will be. The stronger the negative pressure within the chamber, the greater the impedance to the liquids in the housing 12 from exiting into the trough 32. Eventually, because the liquids are acted upon by gravity to exit the housing 12 and enter the trough 32, an equilibrium may be reached between the gravitational effect on the liquids in the housing 12 and the effect of the negative pressure within the chamber, thereby preventing said liquids from leaving the housing 12 and entering the trough 32.

To address this problem, a vent apparatus is interposed. One embodiment of a vent apparatus suitable for use is a flapper or one-way valve (not shown) positioned on or near housing end 16. Said flapper or one-way valve fluidly communicates the chamber with the ambient air outside of the chamber. The valve may be configured to controllably communicate the ambient air into the housing 12 when the pressure in the chamber falls below a predetermined threshold. The valve may be any one or combination of including, but not limited to, check-valves, ball check valves, diaphragm check valve, flapper valve, stop-check valves, lift-check valves, flow check valve, duckbill valves, and the like. The valves may be of such specification that said valve is actuated to fluidly communicate the ambient air with the chamber when pressure therein fall below the predetermined threshold.

Alternatively, in other embodiments, to equalize the pressure in the chamber with the ambient, the housing 12 includes one or more vent tube 20 that fluidly communicate the ambient air with the chamber. Each vent tube 20 has an open upper end 21 disposed within the chamber and an open lower end 23 disposed in or near one or more of the passageways 40, 42 and/or 44 of tray 14. In some embodiments, the vent tube 20 may have a hollow structure separate from the housing 12. In other embodiments, the vent tube 20 may be a hollow slit integrally defined on an inner surface of the housing 12 that connects the trough 32 and the chamber.

Figure 10:
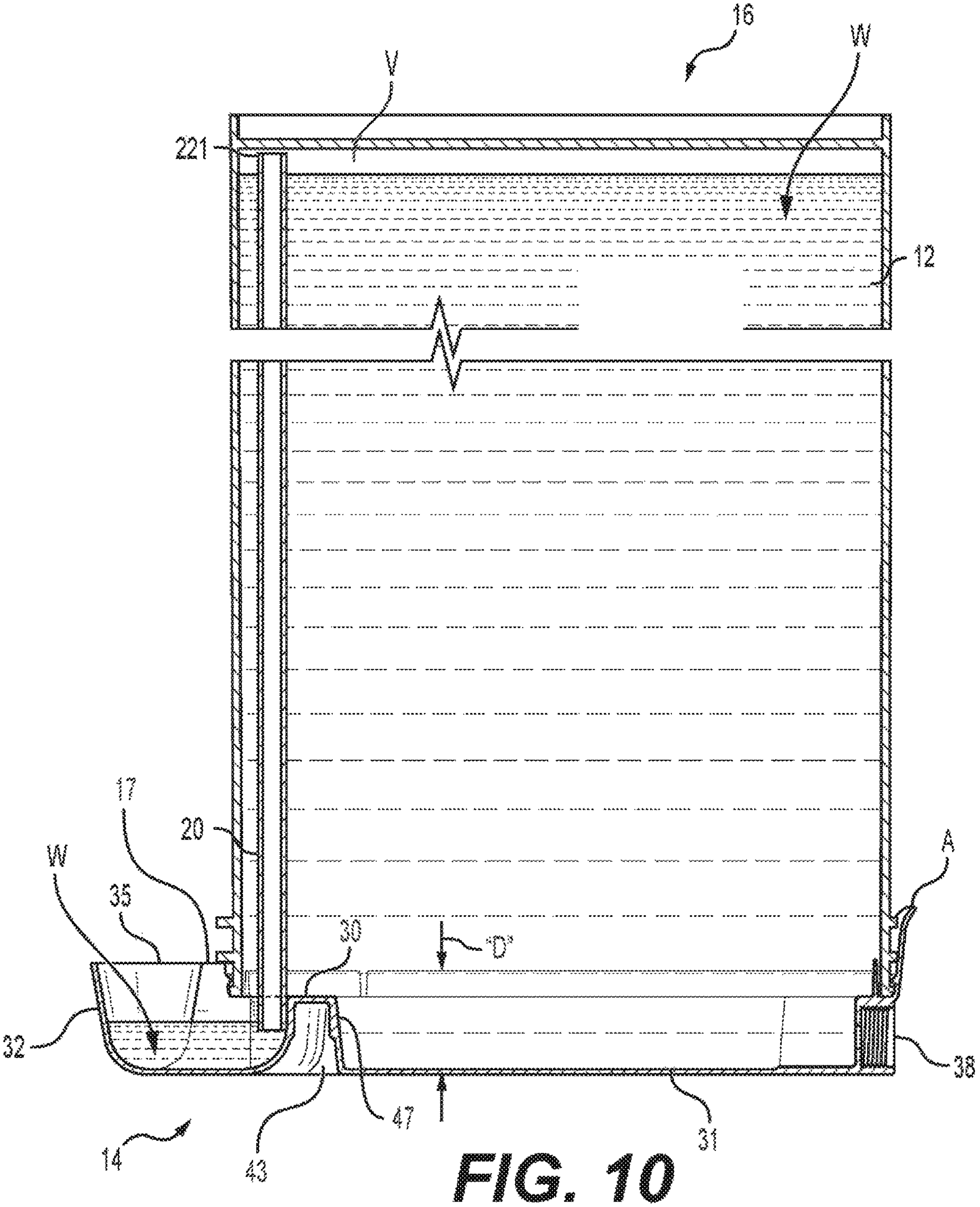
FIG. 10 illustrates a cross-sectional elevational view of an animal drink dispenser apparatus, according to some embodiments of the present disclosure.
Figure 11A:
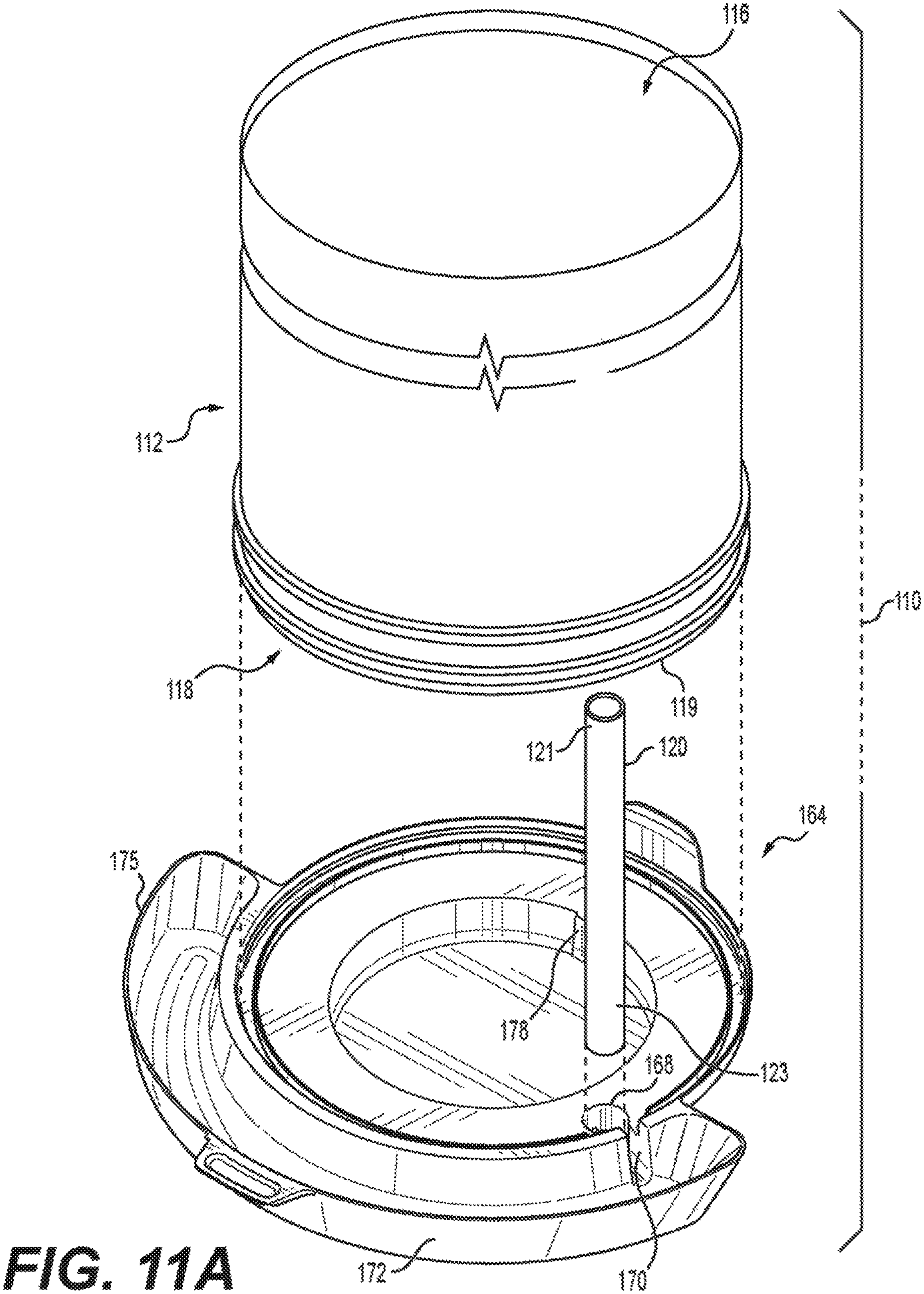
FIGS. 11A-11C depict left front perspective exploded view of an embodiment of an animal drink dispenser.
Figure 11B:
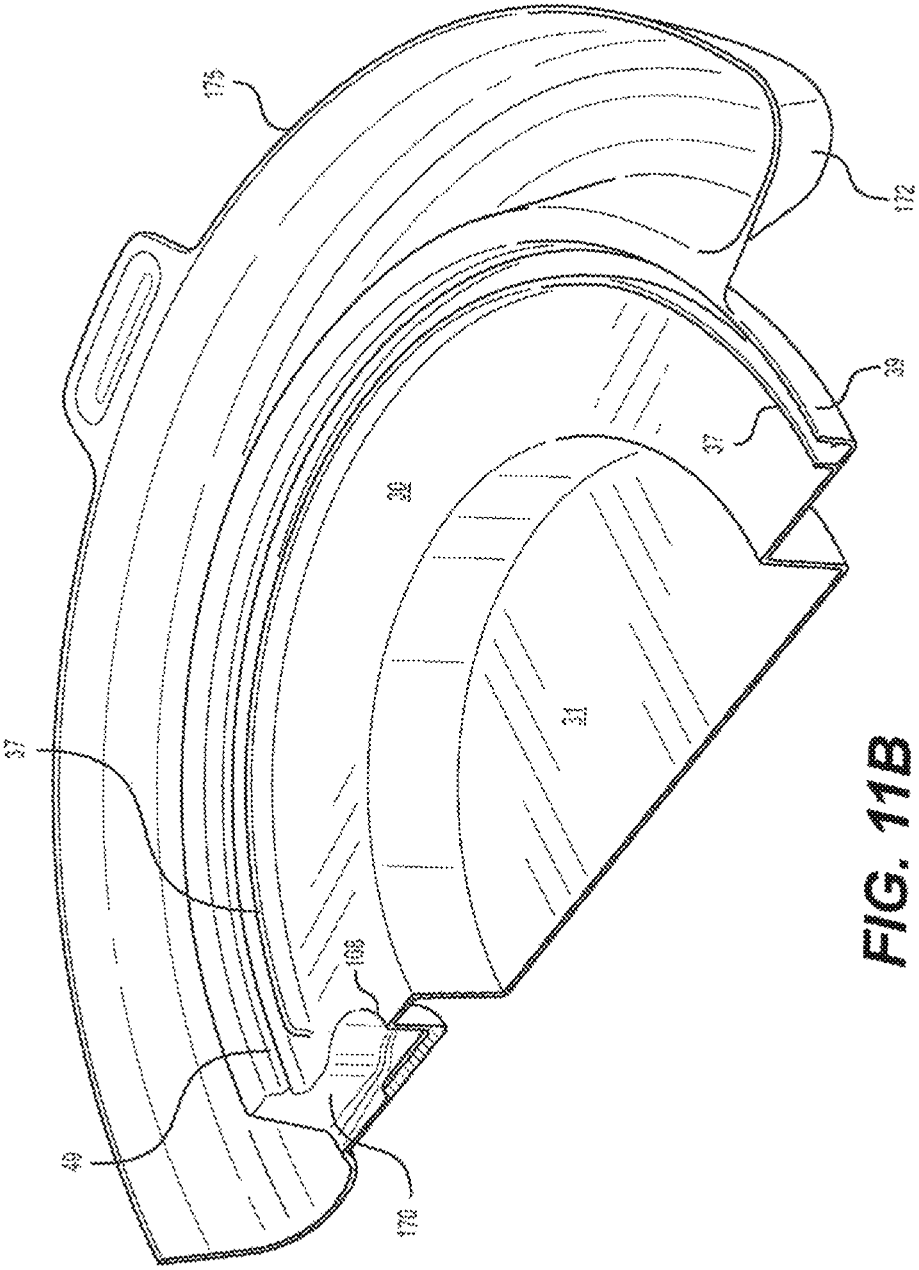
Figure 11C:
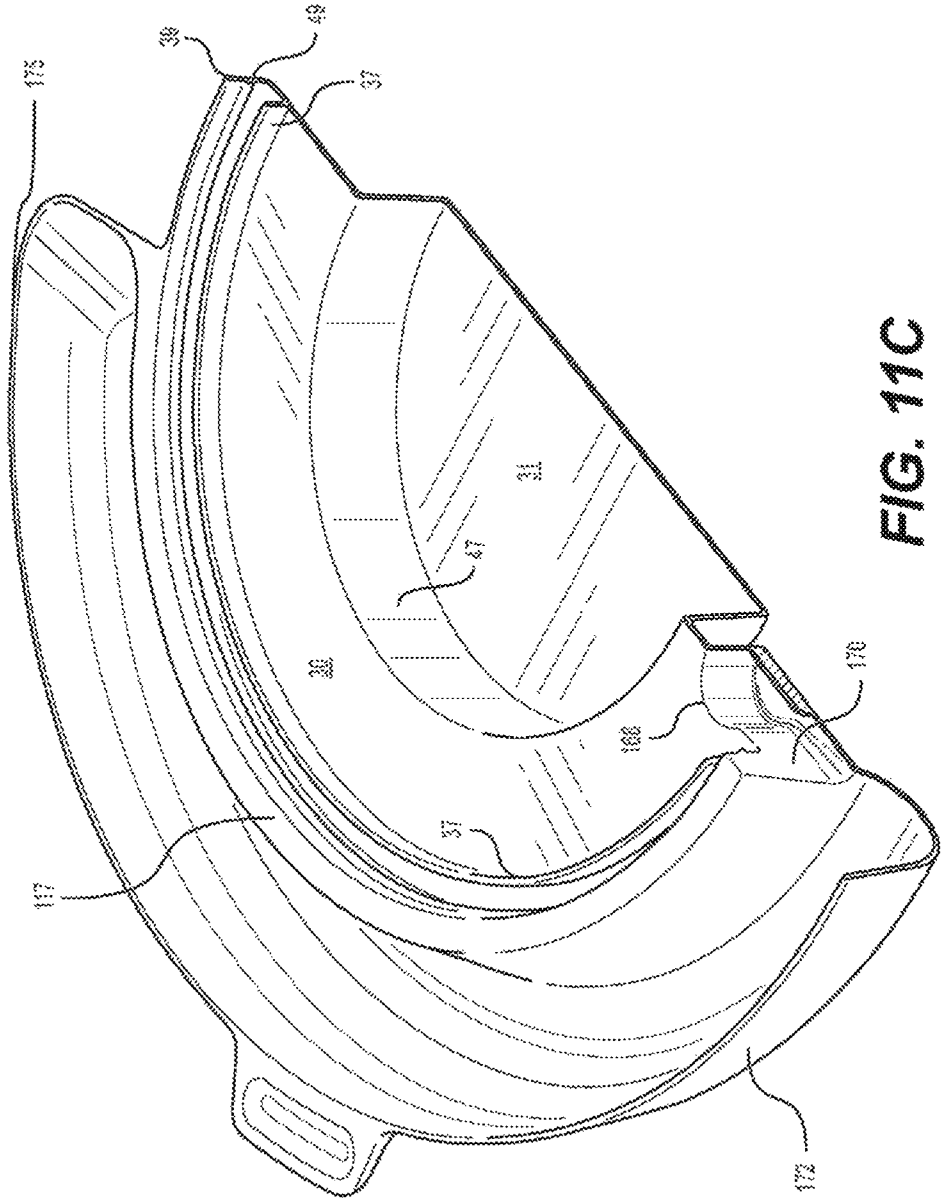

In some embodiments, a socket 36 is defined by one or more of the passageways 40, 42, and/or 44 to receive and hold said vent tube 20, as shown in FIGS. 1A, 1C, 7 and 8. The socket 36 may have a contour corresponding in shape to the cross-sectional shape of the vent tube 20. The passageway 42 having the socket 36 may have a contour similar to a key-hole, as shown by a portion 50 in FIG. 2 and the socket 36 in FIG. 8. The lower end 23 of the vent tube 20 is adapted to seat within the socket 36, to permit fluid communication between the chamber and passageway 40, 42, and/or 44. In some embodiments, the lower end 23 may be submerged in the liquid in the passageway 42, as shown in FIG. 10. As the liquid in the trough 32 is consumed, the level of the liquid in the socket 36 and the corresponding passageway may reduce such that the lower end 23 becomes exposed to the ambient air. The ambient air may then enter the chamber via the vent tube 20, and equalize the pressure of the volume of air V in the chamber with that of the ambient air, permitting additional liquid to pass from housing 12 into trough 32. In some embodiments, the pressure of the ambient air may correspond to atmospheric pressure associated with the geographical location in which the apparatus 10 is placed.

Positioning the vent tube 20 at a plurality of heights with respect to the trough 32 may allow for maintaining a plurality of volumes of liquid in the trough 32. To illustrate, positioning the lower end 23 close to a bottom of the trough 32 may cause said trough 32 to hold lesser volume of liquid compared to when the lower end 23 is positioned away from said bottom of the trough 32. The lower end 23 may be adjustably positioned at a desired distance from the bottom of the trough 32 to maintain a desired volume of the liquid dispensed to said trough 32, based on requirements. With the pressure in the chamber being equalized with the ambient air, the housing 12 may allow liquids to flow through the passageway to the trough 32, until the lower end 23 again submerges into the liquid dispensed to said trough 32 and negative pressure is created in the chamber. In this way, the ambient air outside of the trough 32 is fluidly communicated with air in the chamber, to maintain an equilibrium in which a level of liquid in the trough 32 may tend to not overflow the edge 35 of the trough 32.

Correspondingly, the vent tube 20 may also allow the housing 12 to be refilled without pressurizing the chamber. When the housing 12 is refilled with liquids via the liquid inlet 38, the volume of air in the chamber is pushed out via the vent tube 20 to the ambient, thereby preventing a positive pressure from being accumulated within the chamber. On pushing the air out, an equilibrium may be reached between the ambient air and the pressure within the chamber. In other embodiments, the upper end wall 16, or a portion thereof, may be removed to place liquid into the interior volume of the housing 12.

Figure 12:
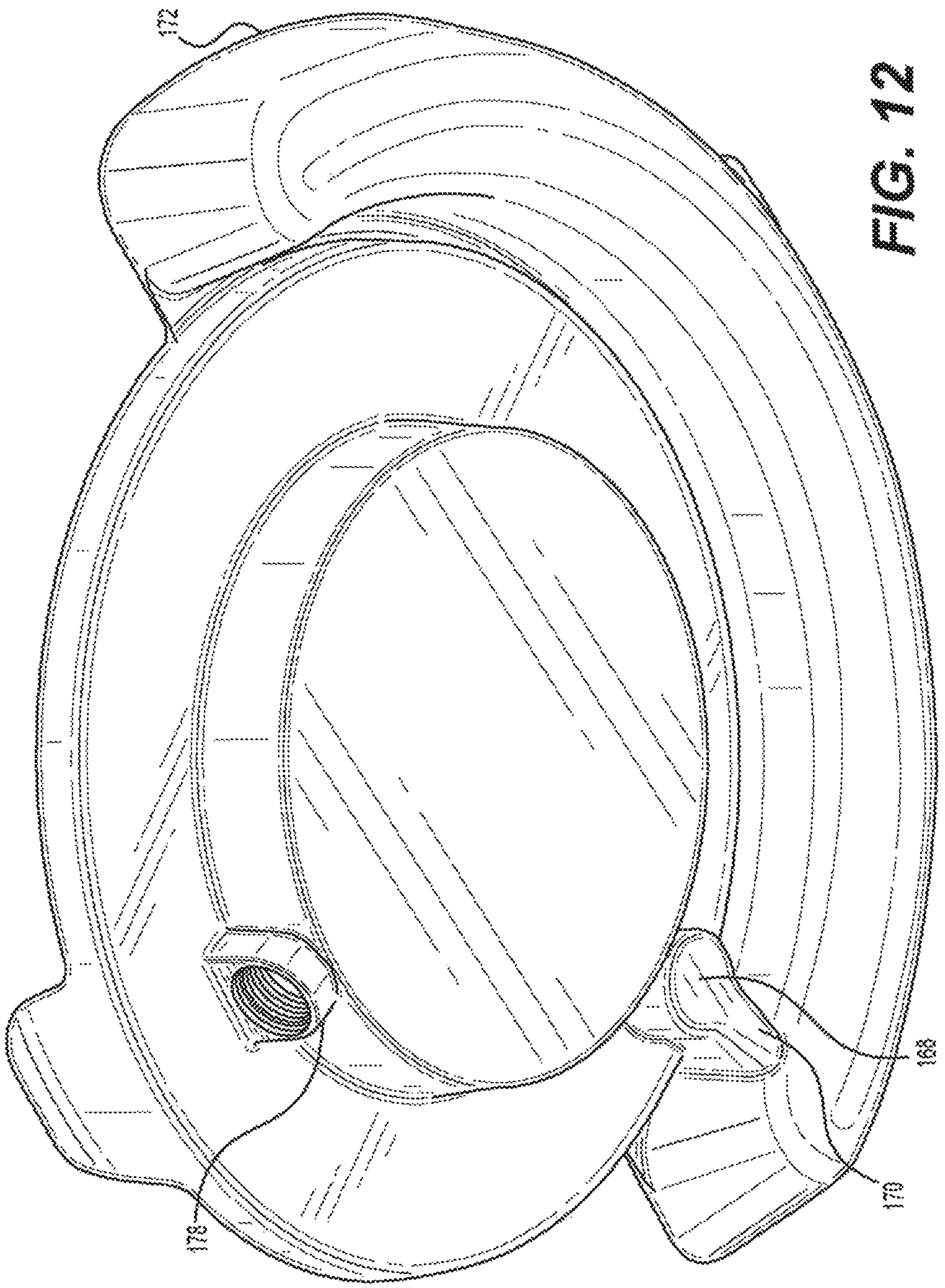
Figure 13:
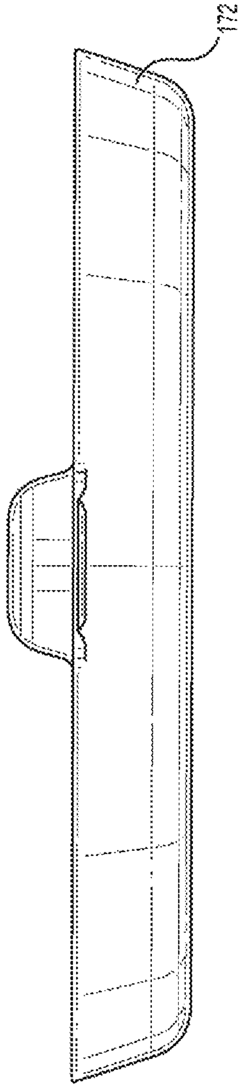
FIG. 13 illustrates a front elevational view of an animal drink dispenser apparatus, according to some embodiments of the present disclosure.
Figure 14:
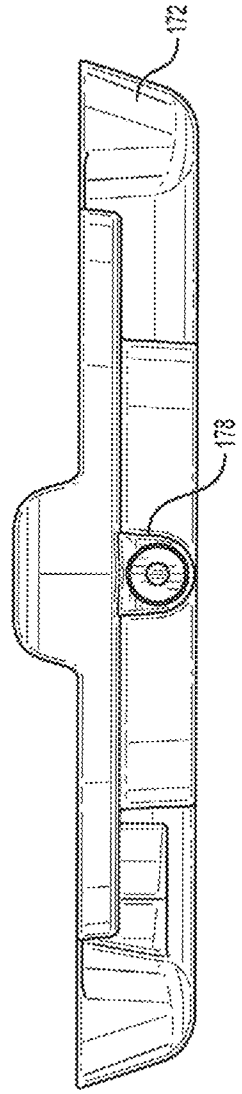
FIG. 14 illustrates a rear elevational view of an animal drink dispenser apparatus, according to some embodiments of the present disclosure.
Figure 15:
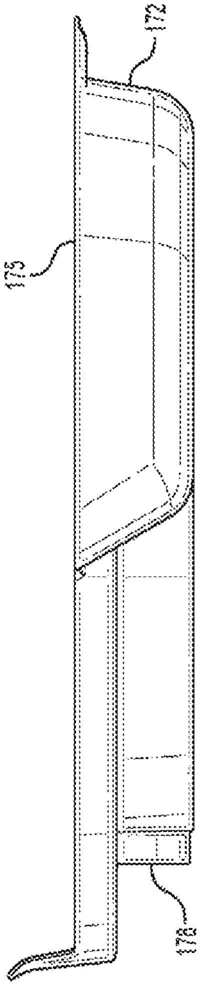
FIG. 15 illustrates a right-side elevational view of an animal drink dispenser apparatus, according to some embodiments of the present disclosure.
Figure 16:
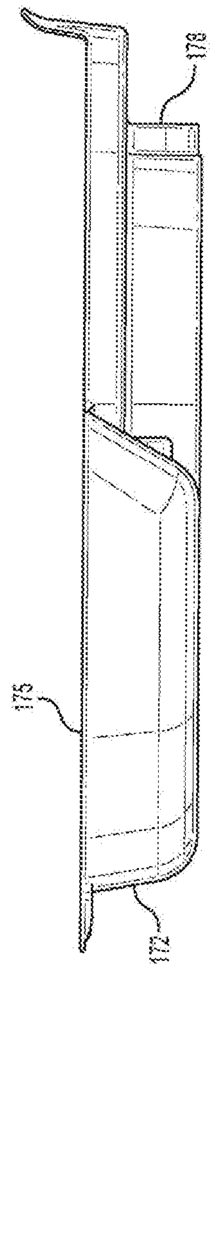
FIG. 16 illustrates a left-side elevational view of an animal drink dispenser apparatus, according to some embodiments of the present disclosure.
Figure 17:
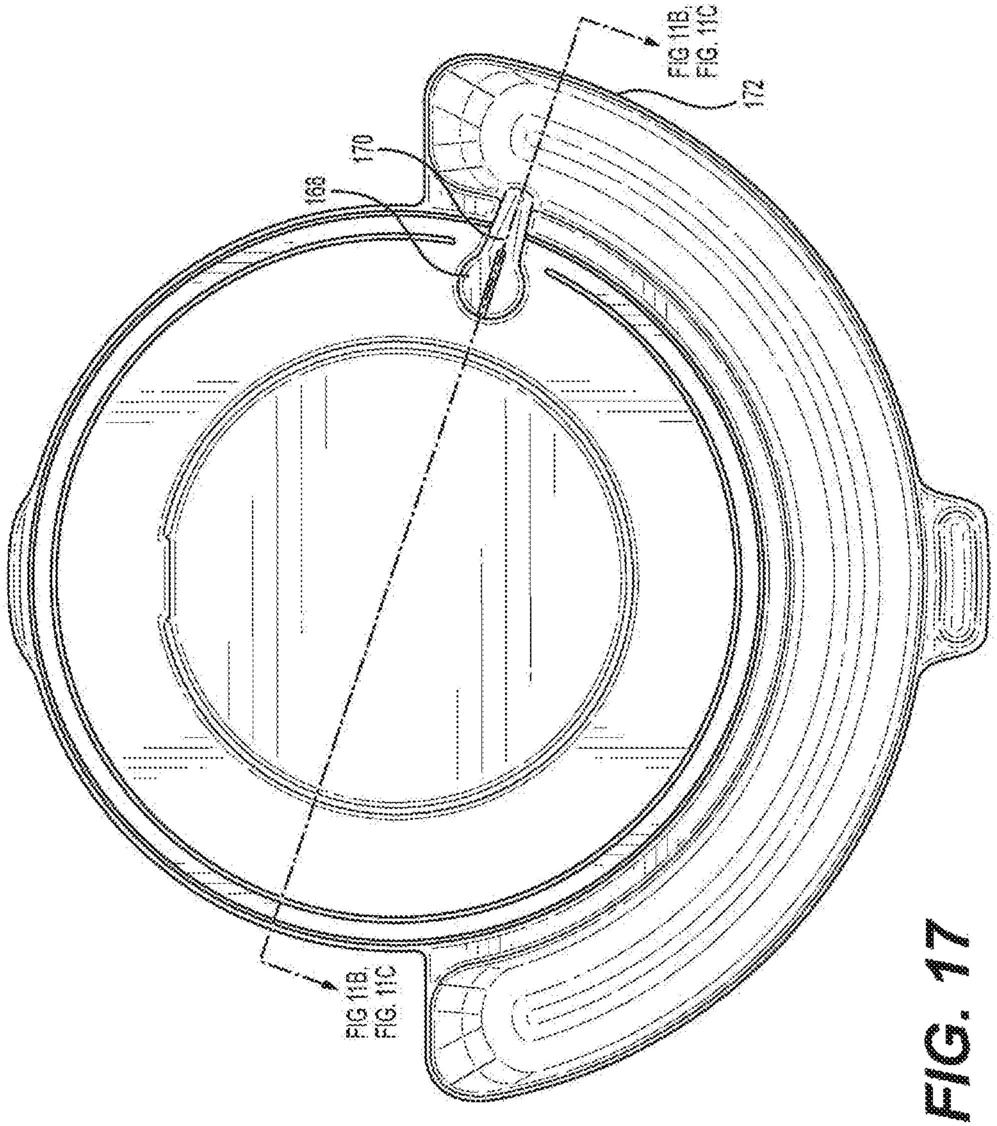
FIG. 17 illustrates a top view of an animal drink dispenser apparatus, according to some embodiments of the present disclosure.
Figure 18:
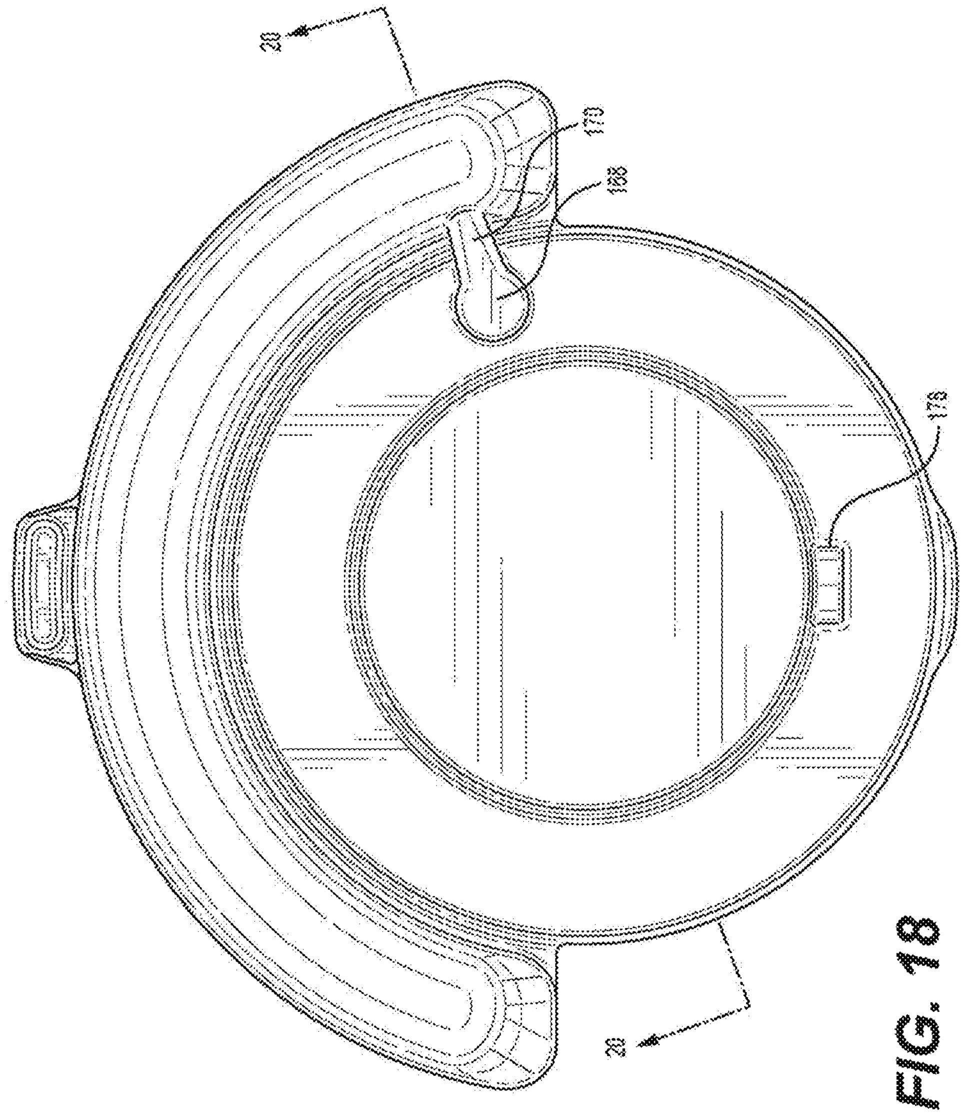
FIG. 18 illustrates bottom view of an animal drink dispenser apparatus, according to some embodiments of the present disclosure.
Figure 19:
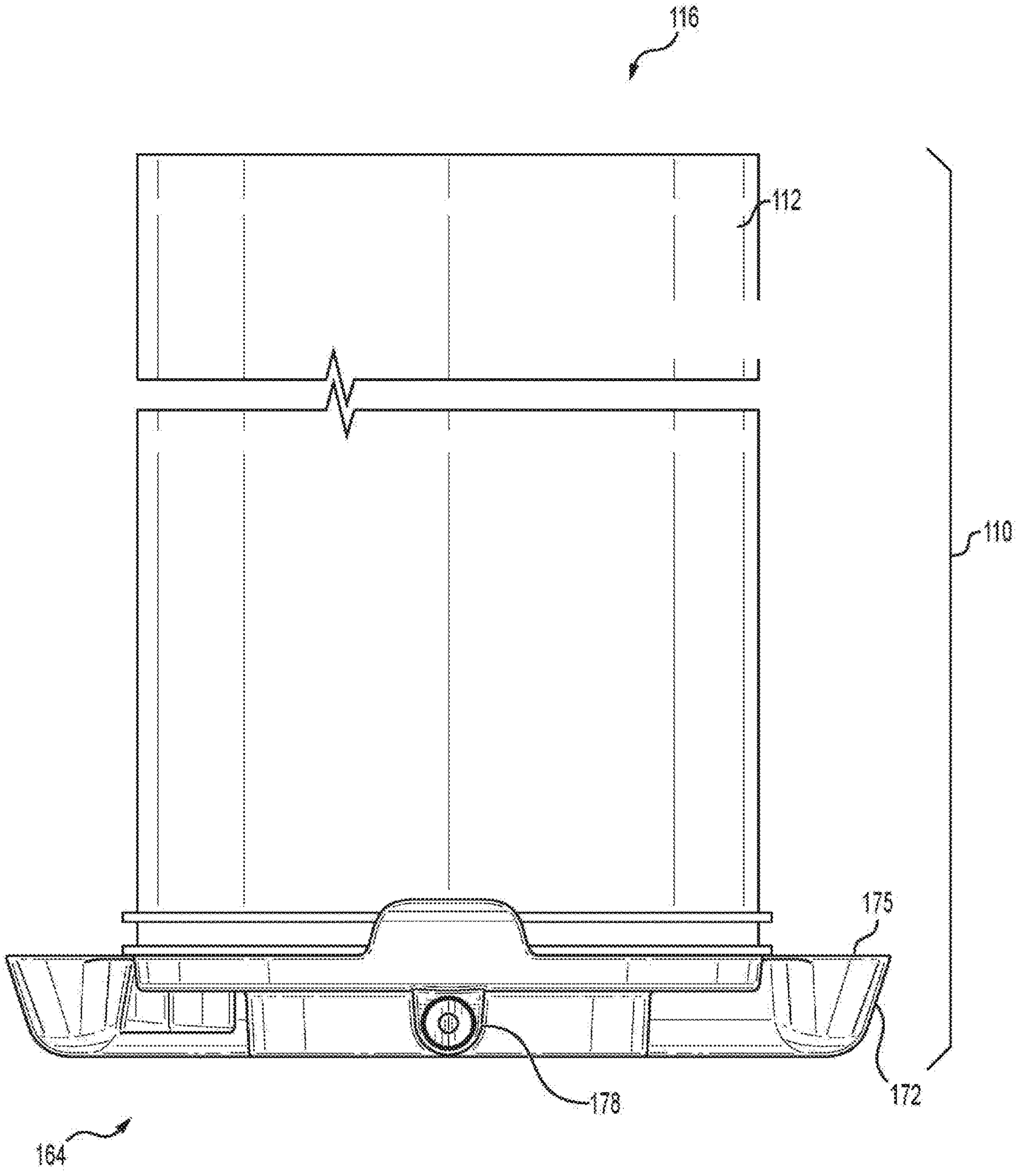
FIG. 19 illustrates an assembled rear elevational view of an embodiment of an animal drink dispenser apparatus, according to some embodiments of the present disclosure.
Figure 20:
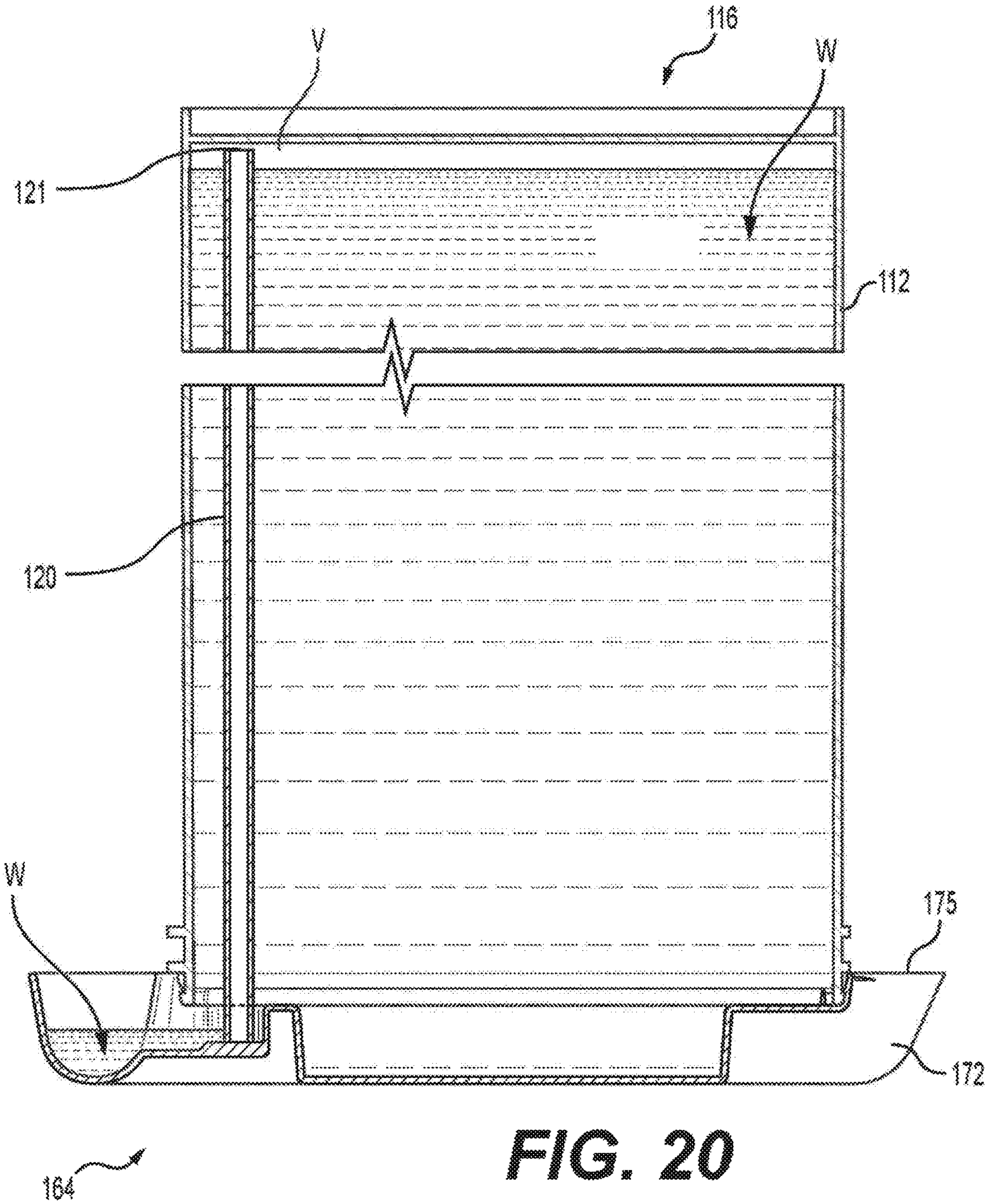
FIG. 20 illustrates a cross-sectional elevational view of an animal drink dispenser apparatus, according to some embodiments of the present disclosure.
Figure 21A:
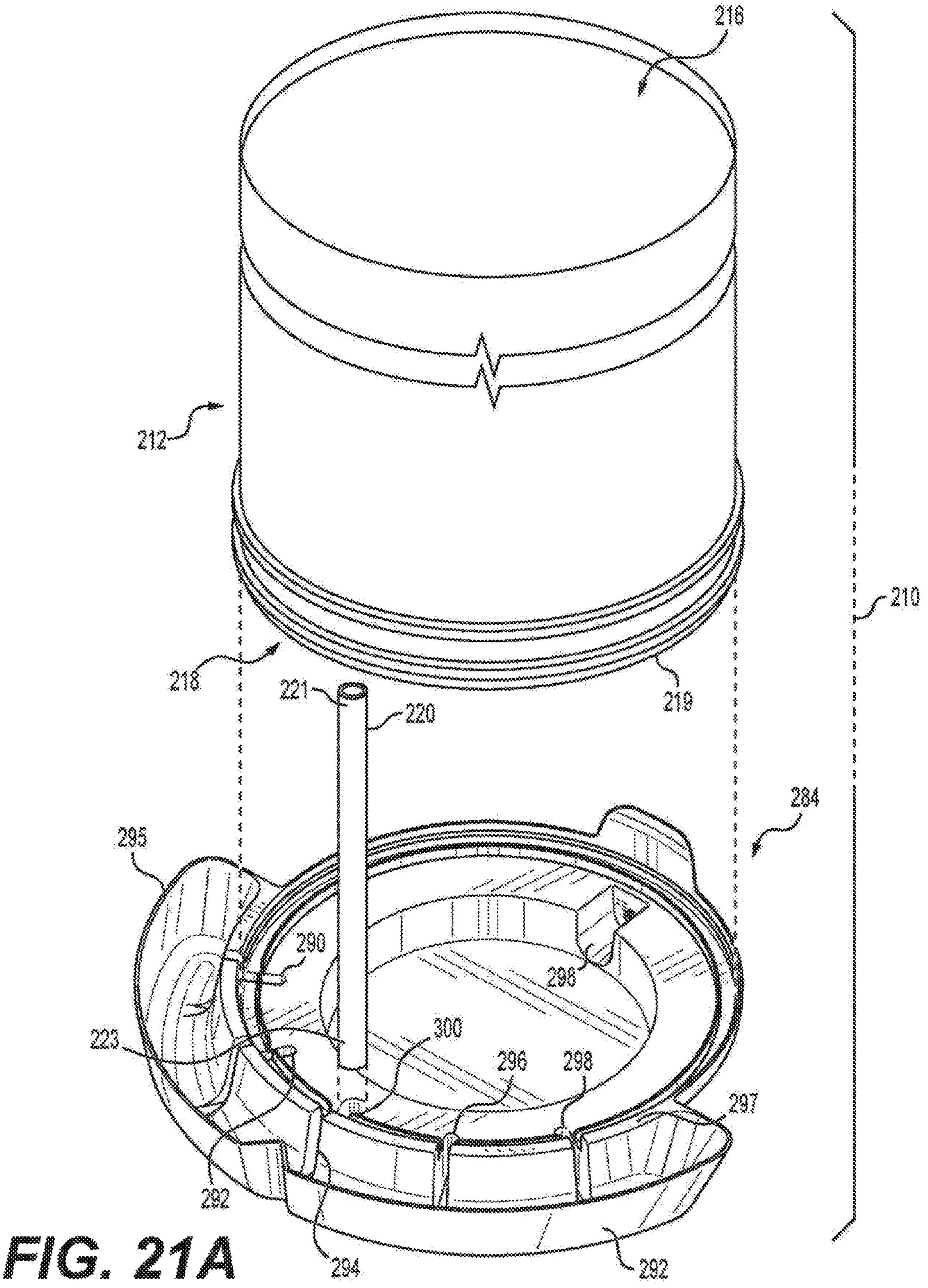
FIGS. 21A-21C depict left front perspective exploded view of an embodiment.
Figure 21B:
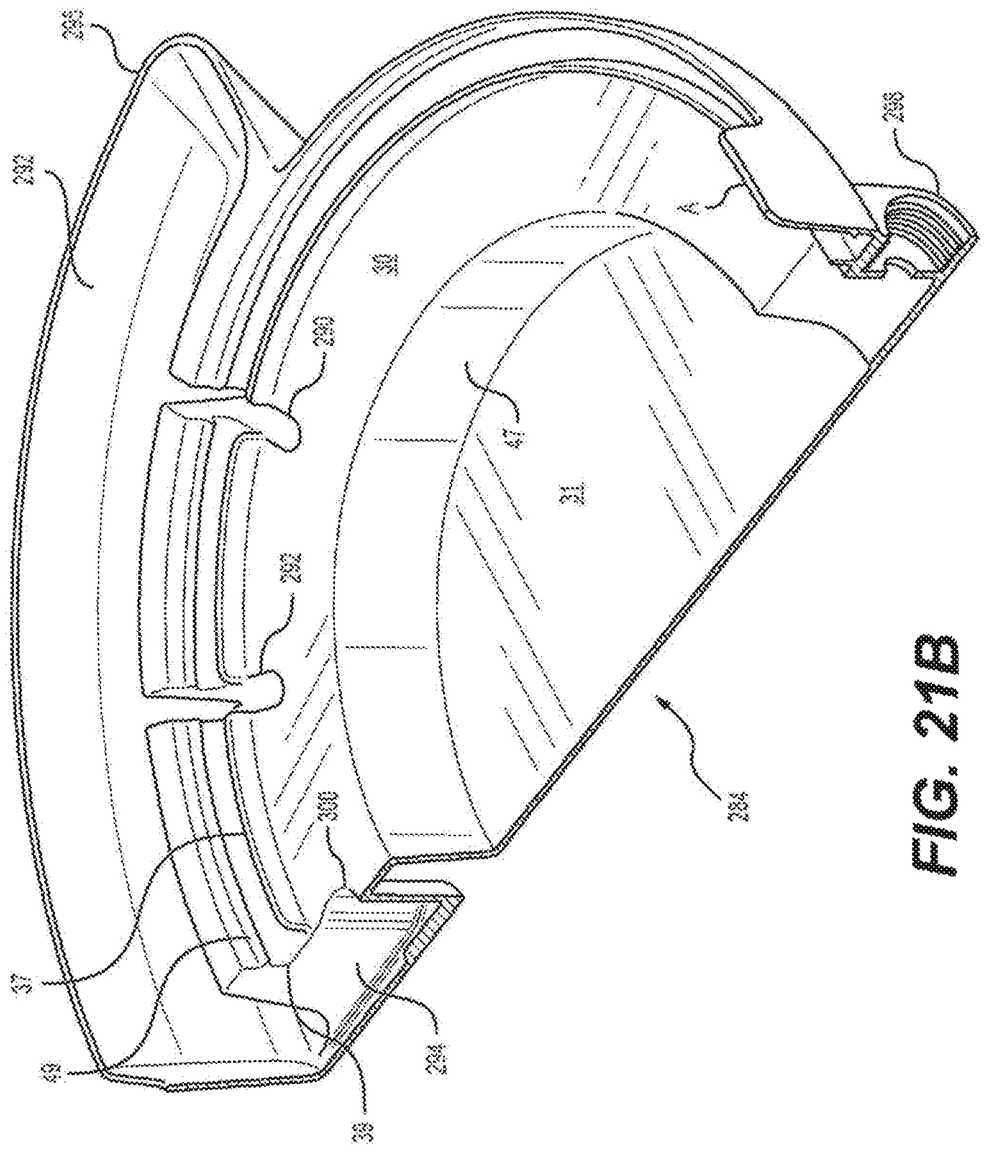
Figure 21C:
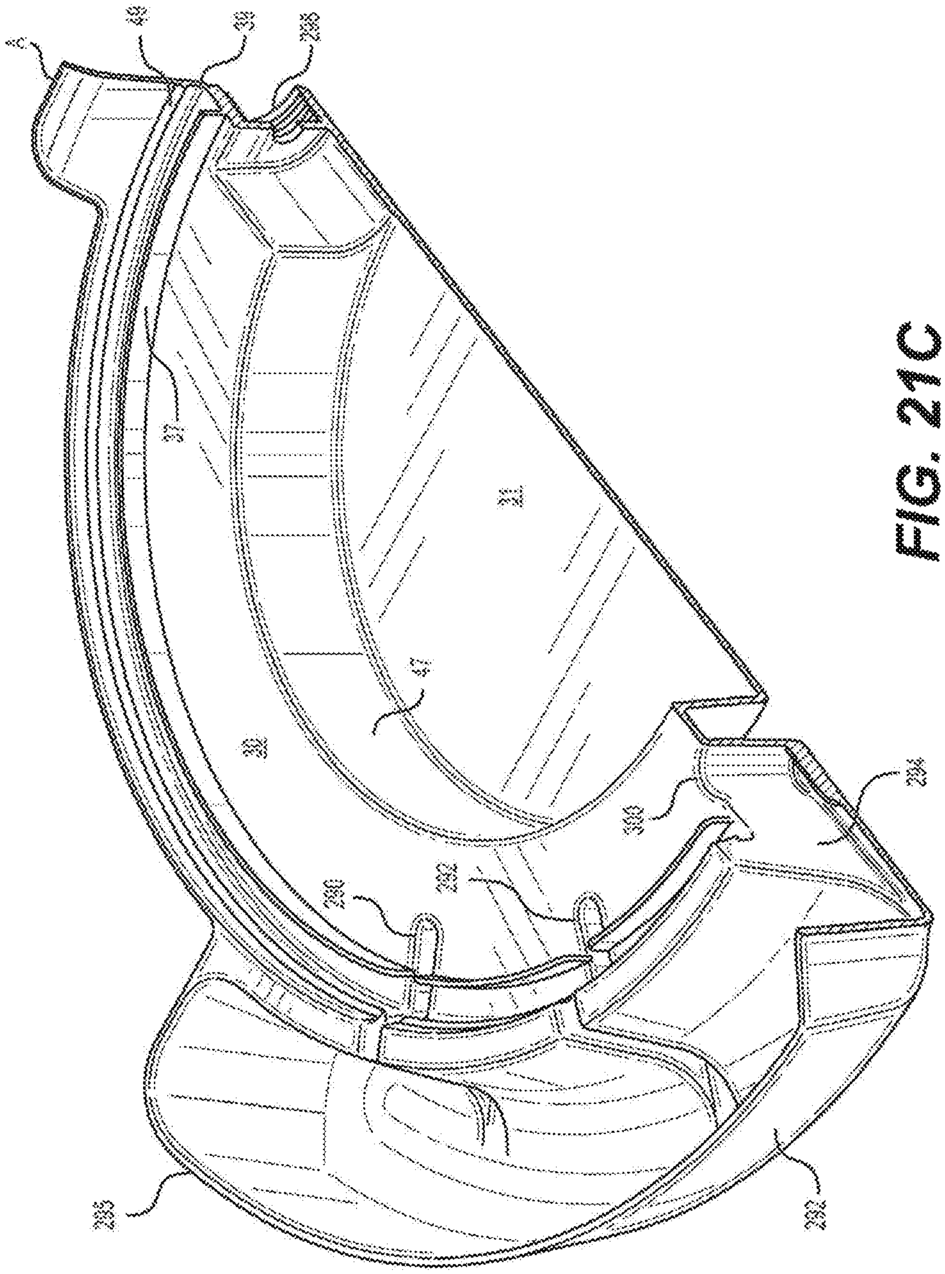
Figure 22:
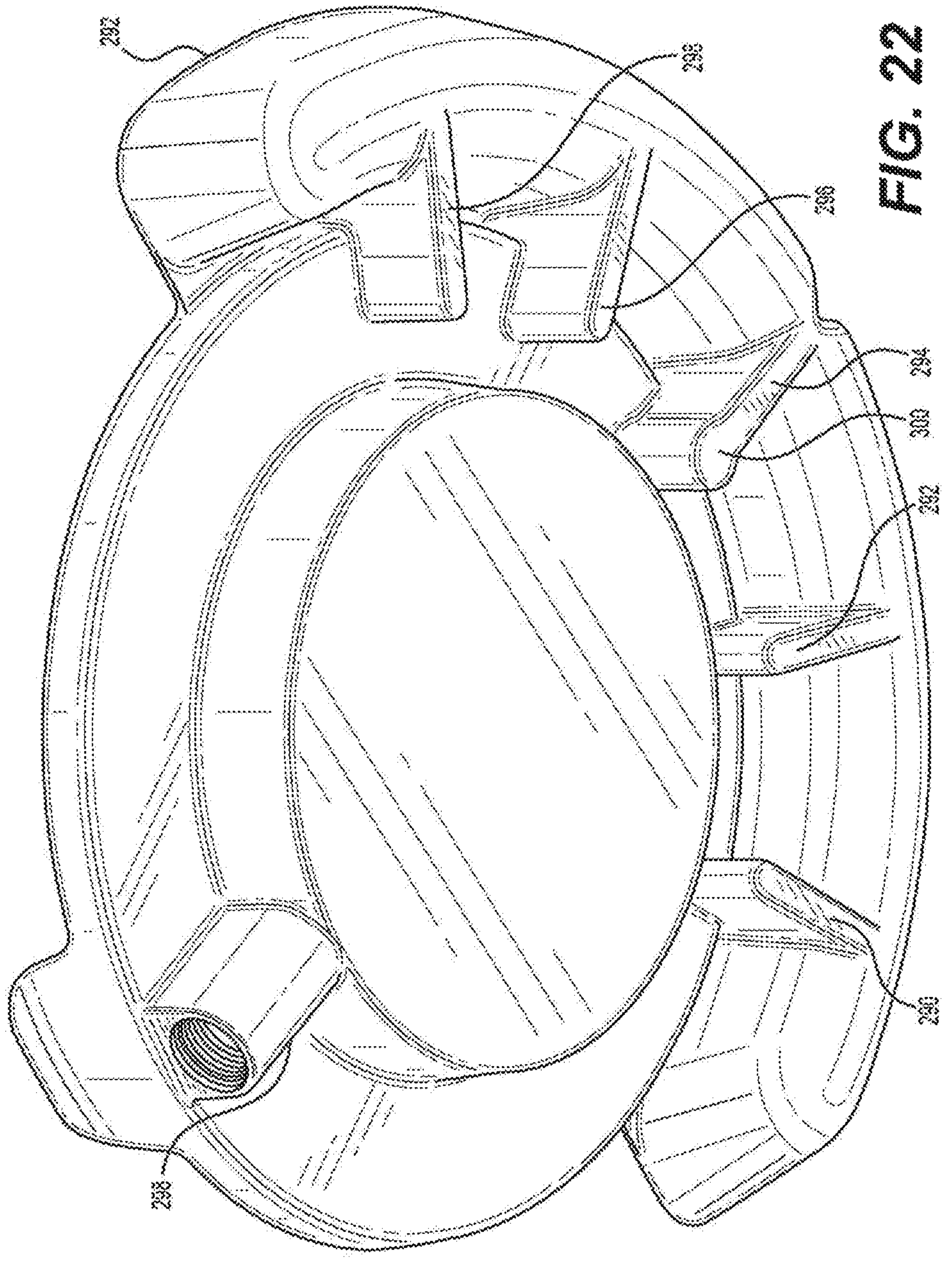
FIG. 22 illustrates a bottom left perspective view of a bottom tray of an animal drink dispenser apparatus, according to some embodiments of the present disclosure.
Figure 23:
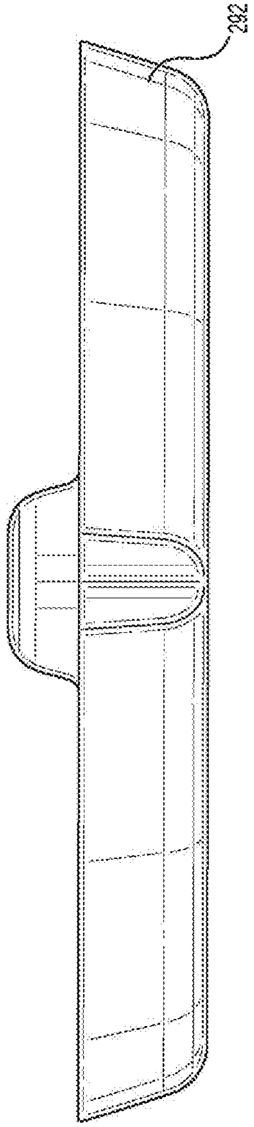
FIG. 23 illustrates a front elevational view of an animal drink dispenser apparatus, according to some embodiments of the present disclosure.
Figure 24:
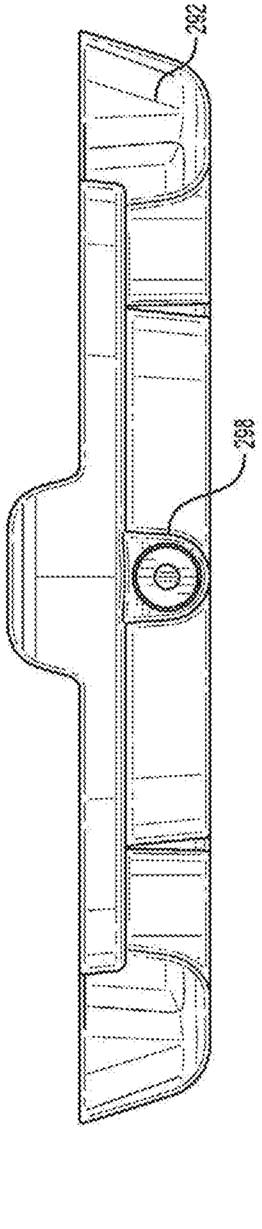
FIG. 24 illustrates rear elevational view of an animal drink dispenser apparatus, according to some embodiments of the present disclosure.
Figure 25:
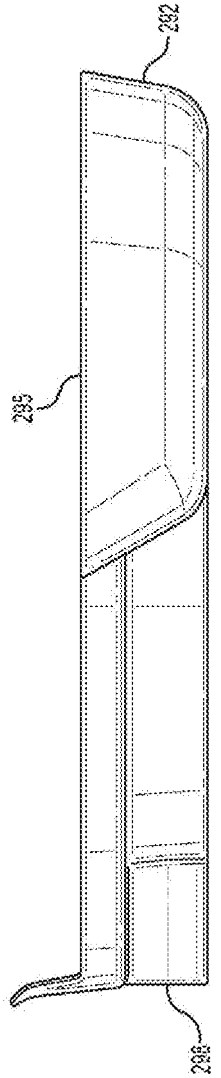
FIG. 25 illustrates a right-side elevational view of an animal drink dispenser apparatus, according to some embodiments of the present disclosure.
Figure 26:
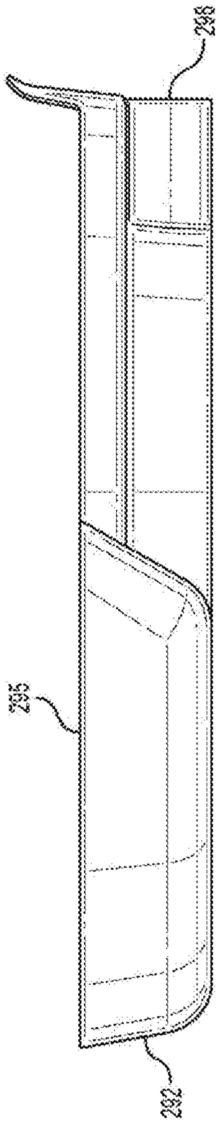
FIG. 26 illustrates a left-side elevational view of an animal drink dispenser apparatus, according to some embodiments of the present disclosure.
Figure 27:
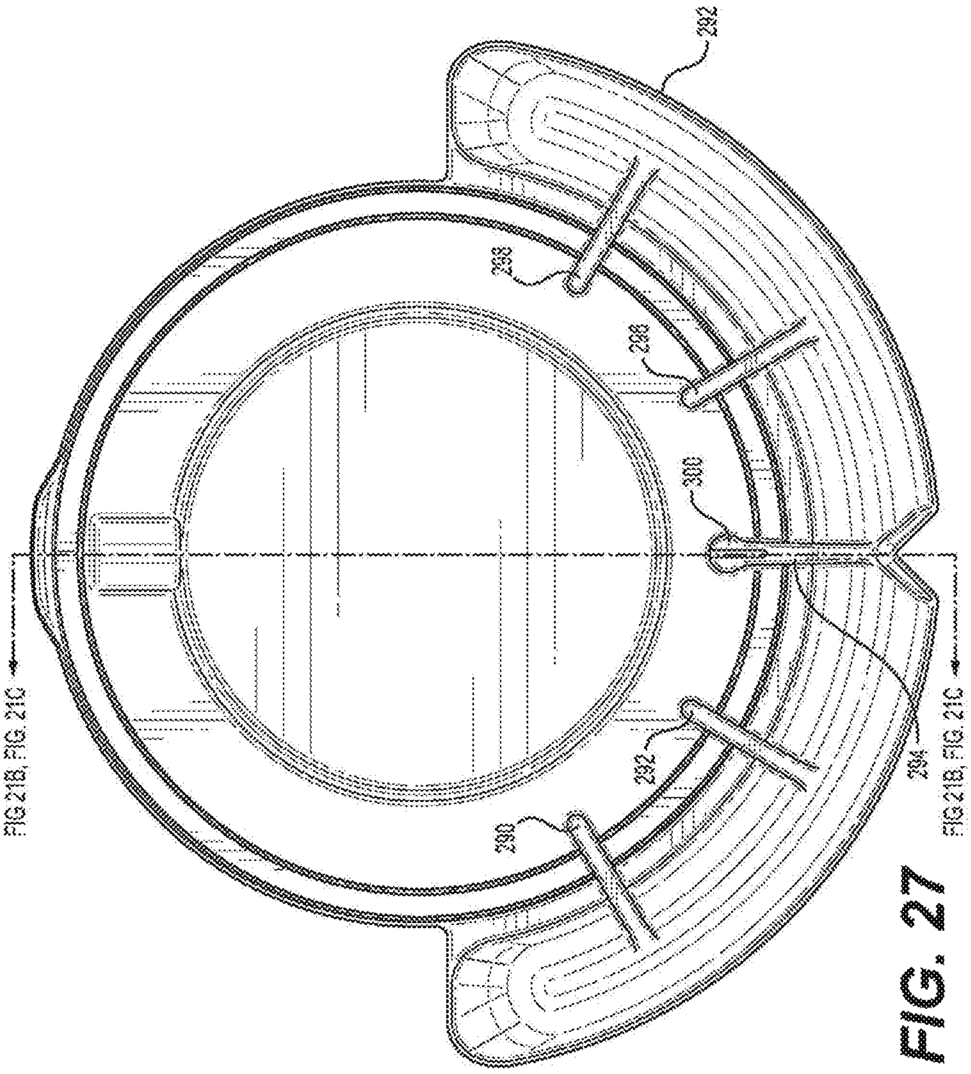
FIG. 27 illustrates a top view of an animal drink dispenser apparatus, according to some embodiments of the present disclosure.
Figure 28:
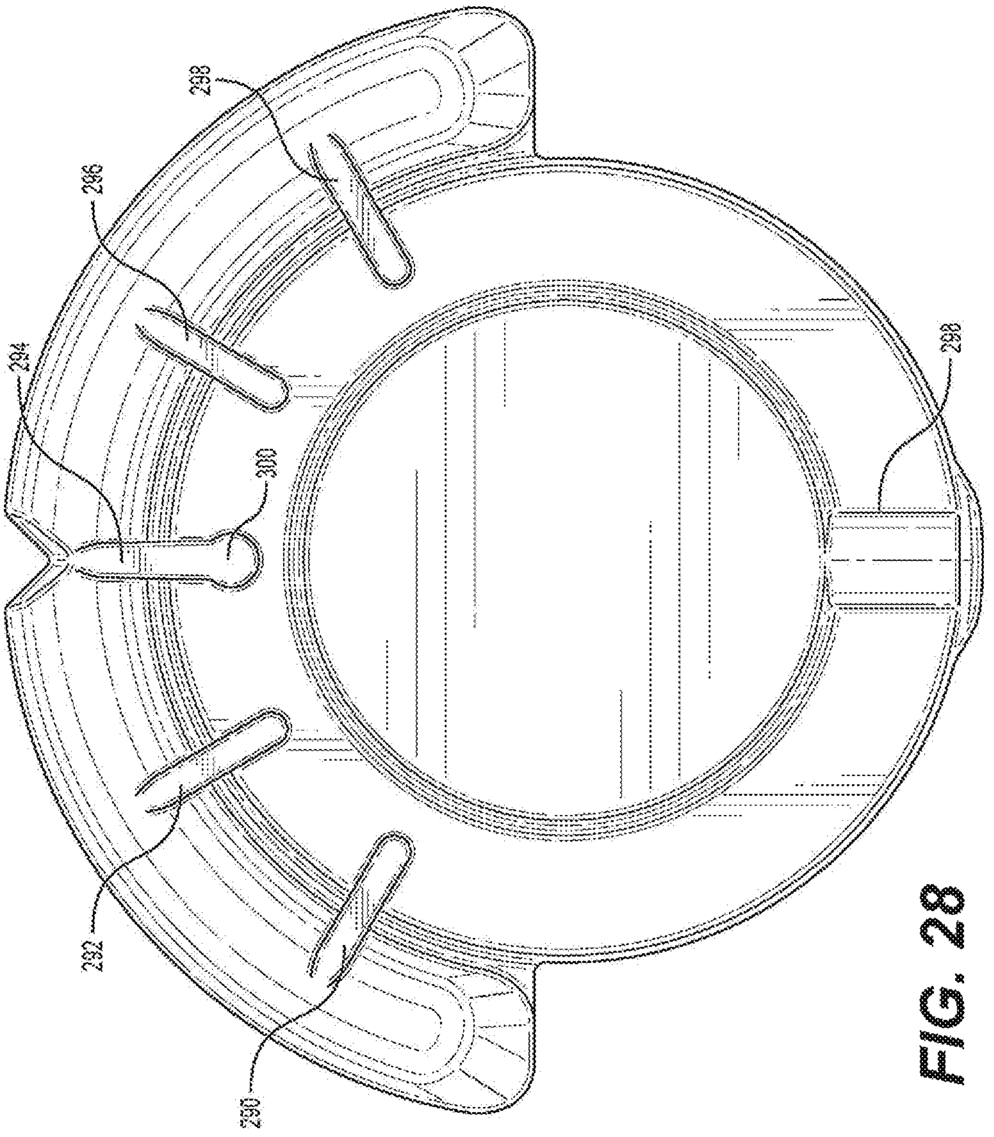
FIG. 28 illustrates bottom view of an animal drink dispenser apparatus, according to some embodiments of the present disclosure.
Figure 29:
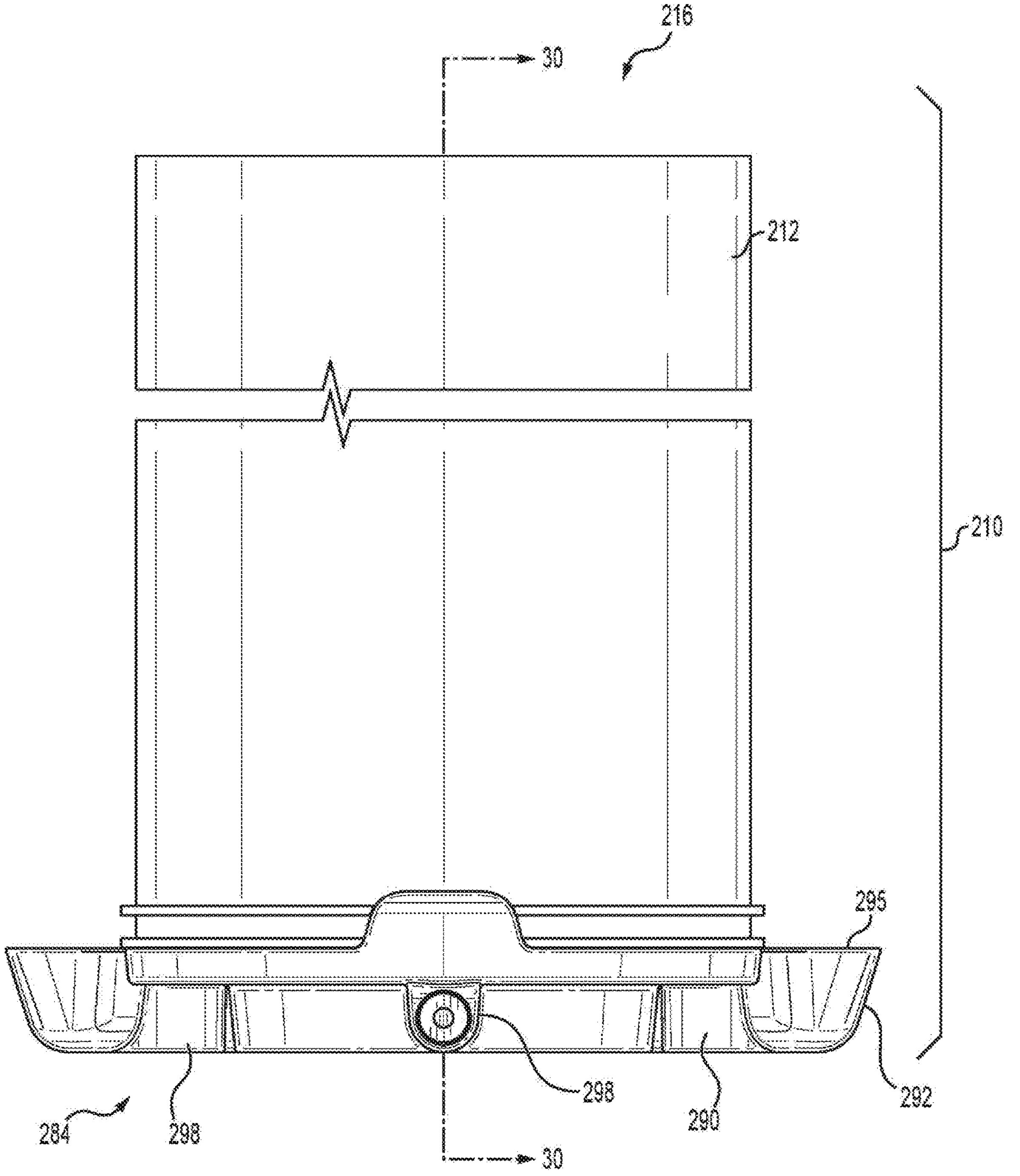
FIG. 29 illustrates an assembled rear elevational view of the first embodiment of an animal drink dispenser apparatus, according to some embodiments of the present disclosure.
Figure 30:
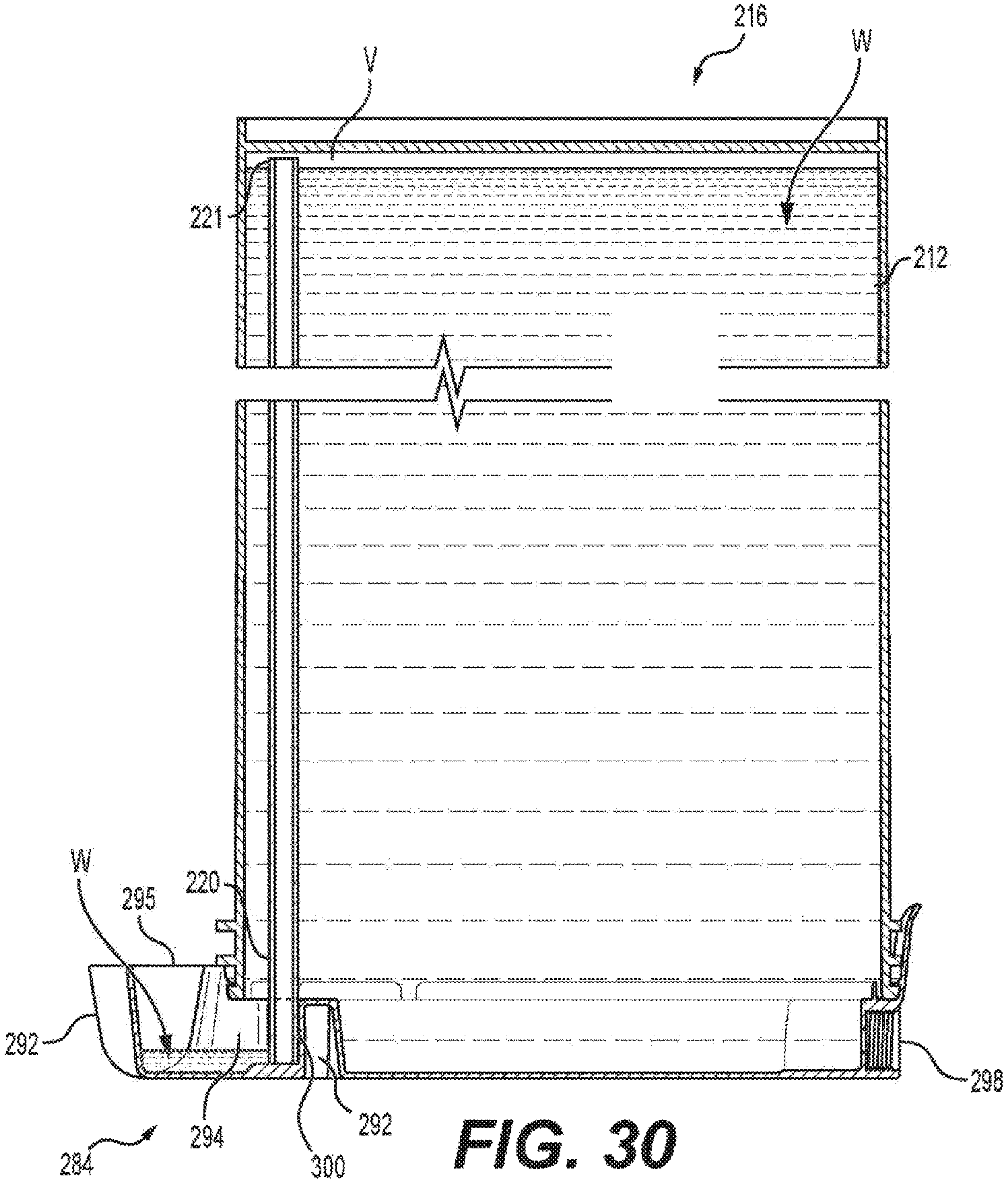
FIG. 30 illustrates a cross-sectional elevational view of an animal drink dispenser apparatus, according to some embodiments of the present disclosure.

FIGS. 11-20 depict another embodiment of the disclosure, in which an apparatus 110 may include a bottom tray 164 defining a single passageway 170 to fluidly communicate the liquids within housing 112 with a trough 172. Having the passageway 170 for dispensing liquids to the trough 172 may allow the corresponding apparatus 110 to have reduced points of failure, thereby reliably regulating dispensation of liquids from the corresponding housing 112. A vent pipe socket 168 is used to receive lower end 123 of a corresponding vent tube 120, the functionalities of which correspond to those of the socket 36, the lower end 23, and the vent tube 20, respectively. The passageway 170 may have a contour similar to that of a keyhole to accommodate the vent pipe socket 168 therein, as shown in FIG. 12 and cross-sectional representation of the bottom tray 164 in FIGS. 11B and 11C, along line indicated in FIGS. 17 and 18. The passageway 170 may be defined at any location with respect to trough 172, such as at or near an end of the trough 172. The passageway 170 may be defined to be from about ⅛" to about 2" in width, and from about 1" to about 4" in depth. It has been found by experimentation, in certain embodiments, that passageway 170 having a width "W" of between ⅛"-1" and depth "D" of 1¼"-2" work suitably. The liquid inlet 178 may be employed to maintain a supply of liquid in the housing 112, similar to the liquid inlet 38. Similarly, an upper end wall 116, a lower end wall 118, a bottom edge 119, an open upper end 121, and an upper edge 175 in FIGS. 11 to 20 may correspond to the upper end wall 16, the lower end wall 18, the bottom edge 19, the upper end 21, and the trough edge 35 of FIGS. 1-10, respectively.

FIGS. 21-30 depict another embodiment of the disclosure, in which an apparatus 210 may include a bottom tray 284 defining one or more passageways 290,292,294,296, and 298 in a housing 212. Having multiple passageways 290, 292, 294, 296, and 298 may allow the corresponding apparatus 210 to have increased control over the rate of dispensation of liquids from the corresponding housing 212 to a trough 292. The trough 292 may have at least one portion of the trough has a concaving contour. The passageways 290, 292, 296, and 298 may be defined with a substantially linear contour on a wall 297, the functionality of which corresponds to that of the wall 17. In embodiments as shown in FIGS. 21-30, the apparatus 10 may have 5 passageways. The passageways 290, 292, 294, 296, and 298 are defined radially on the bottom tray 284. The at least one portion, such as passageway 294, may be defined in proximity to the at least one of the passageways such that obstructions are prevented from blocking said passageway. A socket 300 is defined in association with one of the passageways, such as passageway 294, to receive a lower end 223 of a vent pipe 220, the functionalities of which correspond to that of the socket 36, the lower end 23, and the vent tube 20, respectively. The vent apparatus may fluidly communicate the ambient air into the volume of air based on level of the liquids on the at least one portion of the trough 292. The liquid inlet 298 may be employed to maintain a supply of liquid into the housing 212, similar to the liquid inlet 38. Similarly, an upper end wall 216, a lower end wall 218, a bottom edge 219, an open upper end 221, and an overflow upper edge 295 of FIGS. 21 to 30 may correspond to the upper end wall 16, the lower end wall 18, the bottom edge 19, the upper end 21, and the trough overflow edge 35 of FIGS. 1-10, respectively.

In some embodiments, the apparatus 10, 110, or 210 may be placed on the floor or the ground to allow animals to drink liquids therefrom. In other embodiments, the apparatus 10, 110, or 210 may be suspended from a support structure such as trees, buildings, fences, table, stool, wails, and the like, at a conveniently accessible location for the animals. The animals may include, but not be limited to, chickens, turkeys, ducks, geese, quail, horses, cattle, sheep, goats, pigs, dogs, cats, and the like. The contours and dimensions of the apparatus 10, 110, or 210 may be suitably adapted for the particular animal for which itis intended. Animals may consume liquids, such as drinking water, from the trough 32. As levels of liquids in the trough 32 drop, the vent apparatus may equalize the negative pressure created in the chamber of the housing 12, thereby allowing said housing 12 to further dispense liquids into the trough 32 until an equilibrium between the pressure in chamber and the force of gravity is reached. Hence, the apparatus 10, 110, or 210 provides for self-regulated dispensation of liquids into the trough 32 with non-moving parts.

Figure 31:
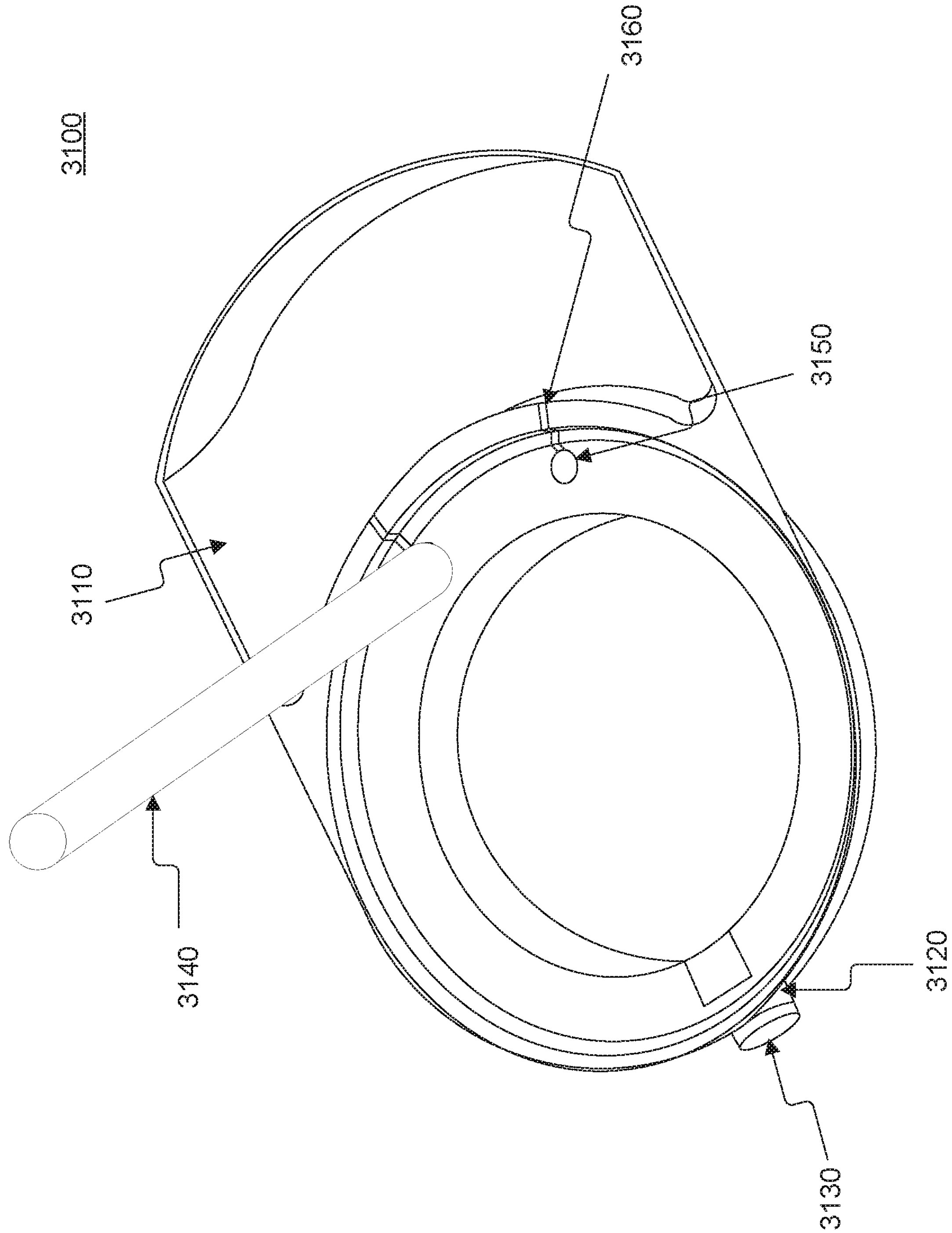
FIG. 31 illustrates a top perspective of an animal drink dispenser apparatus, according to some embodiments of the present disclosure.

Referring now to FIG. 31, a top perspective of an animal drink dispenser apparatus 3100, according to some embodiments of the present disclosure, is illustrated. In some embodiments, the animal drink dispenser apparatus 3100 may be configured to attach to a housing capable of storing a volume of fluid. In some aspects, the animal drink dispenser apparatus 3100 may be a substantially rigid, circular structure. In some implementations, the animal drink dispenser 3100 may include an interior facing side and an exterior facing side, wherein the interior facing side may include two concentric inner and outer ridges configured to attach to the housing.

In some embodiments, the animal drink dispenser apparatus may include a bottom tray 3110, a liquid inlet 3120, a capping mechanism 3130, and a vent apparatus 3140. In some implementations, the bottom tray 3110 may protrude from the animal drink dispenser apparatus 3100 configured to hold an exposed supply of fluids. In some embodiments, the bottom tray 3110 may include raised walls, wherein any liquid entering the bottom tray may remain inside the bottom tray 3110. In some aspects, animals may drink or clean themselves using the liquid in the bottom tray 3110, as non-limiting examples.

In some embodiments, the liquid inlet 3120 may be opposite of the bottom tray 3110, wherein the liquid inlet 3120 may include a threated interior configured to receive the supply of liquid to be stored in the housing. In some aspects, the capping mechanism 3130 may include a threaded exterior configured to attach and detach from the liquid inlet 3120. As a way of example and not limitation, the capping mechanism 3130 may twist into the liquid inlet 3120, wherein the threaded exterior of the capping mechanism 3130 attaches to the threaded interior of the liquid inlet 3120. In some embodiments, the vent apparatus 3140 may be positioned within the interior facing side adapted to equalize a pressure in a volume of air above the liquid in the housing. In some aspects, the pressure may be reduced when the liquid may be dispensed to the bottom tray 3110, with ambient air. In some embodiments, the animal drink dispenser apparatus 3100 may not include a liquid inlet 3120, wherein the housing may be filled when the animal drink dispenser apparatus 3100 may be disconnected from the housing. In some aspects, the housing may include an exhaust configured to release air trapped in the housing. In some embodiments, the bottom tray 3110 may be collapsible, wherein the bottom tray 3110 may fold into the center of the animal drink dispenser apparatus 3100.

In some implementations, the vent apparatus 3140 may include an open upper end disposed inside of a housing and an open lower end reversibly submerged into the liquid dispensed through the at least one passageway to the housing such that the vent tube may fluidly communicate with the ambient air to the volume of air in the housing to equalize the pressure when liquid in housing may be consumed. In some embodiments, the interior facing side may include at least one vent receiving aperture 3150, wherein the open lower end may connect to the at least one vent receiving aperture 3150.

In some embodiments, the bottom tray 3210 may include one or more dispensing slots 3160, wherein the one or more dispensing slots 3160 may expel air and liquids from the vent apparatus 3140, wherein the vent apparatus 3140 may be connected to the one or more dispensing slots 3160 at the at least one vent receiving aperture 3150. In some aspects, the animal drink dispenser apparatus 3100 may be configured to connect to a housing, wherein the housing may be configured to store a volume of liquid. In some implementations, liquids may be added to the housing via the liquid inlet 3120.

In some implementations, the animal drink dispenser apparatus 3100 may be self-cleaning, wherein when the volume of liquid reaches the open upper end of the vent apparatus 3140, the liquids may travel down the vent apparatus 3240 and spray out of the one or more dispensing slots 3160. In some aspects, air may be pushed through the one or more dispensing slots 3160 until the liquids reach a predetermined level in the housing. In some embodiments, the housing may receive liquids, wherein the liquids may be dispensed through the vent apparatus 3140 and out of the one or more dispensing slots 3160 in a controlled manner into the bottom tray 3110.

Figure 32:
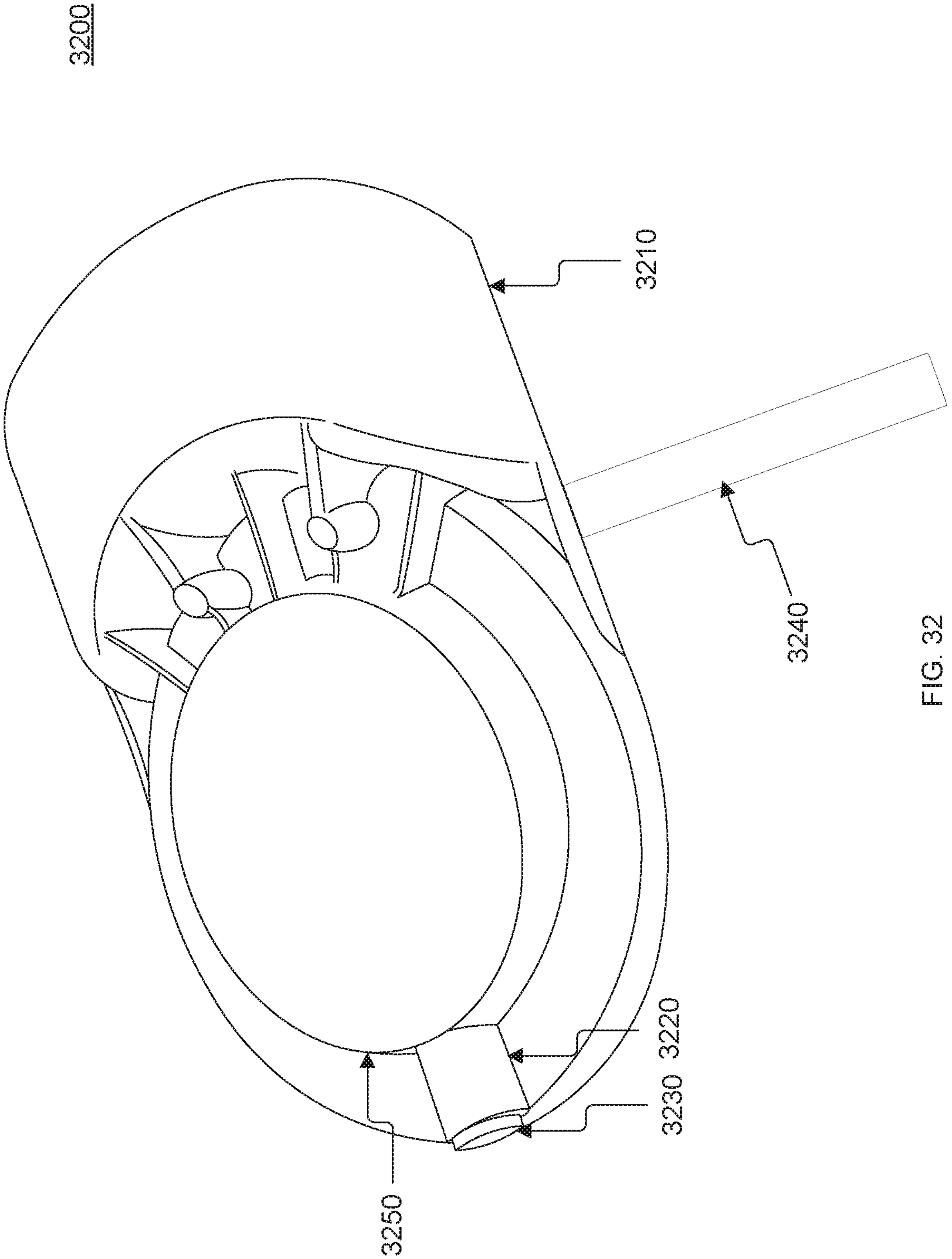
FIG. 32 illustrates a bottom perspective of an animal drink dispenser apparatus, according to some embodiments of the present disclosure.

Referring now to FIG. 32, a bottom perspective of an animal drink dispenser apparatus 3200, according to some embodiments of the present disclosure, is illustrated. In some embodiments, the animal drink dispenser apparatus 3200 may include an interior facing side and an exterior facing side. In some implementations, the animal drink dispenser apparatus may include a bottom tray 3210, a liquid inlet 3220, a capping mechanism 3230, and a vent apparatus 3240.

In some embodiments, the exterior facing side of the animal drink dispenser apparatus 3200 may include an elevated platform 3350, wherein the elevated platform may be provided a grip to attach and detach the animal drink dispenser apparatus 3200. In some aspects, the animal drink dispenser apparatus 3200 may be attached and detached from a housing, wherein the elevated platform 3250 may provide leverage. In some implementations, the animal drink dispenser apparatus 3200 may twist onto a housing, wherein the elevated platform 3250 may provide leverage to attach and detach the animal drink dispenser apparatus 3200.

Figure 33:
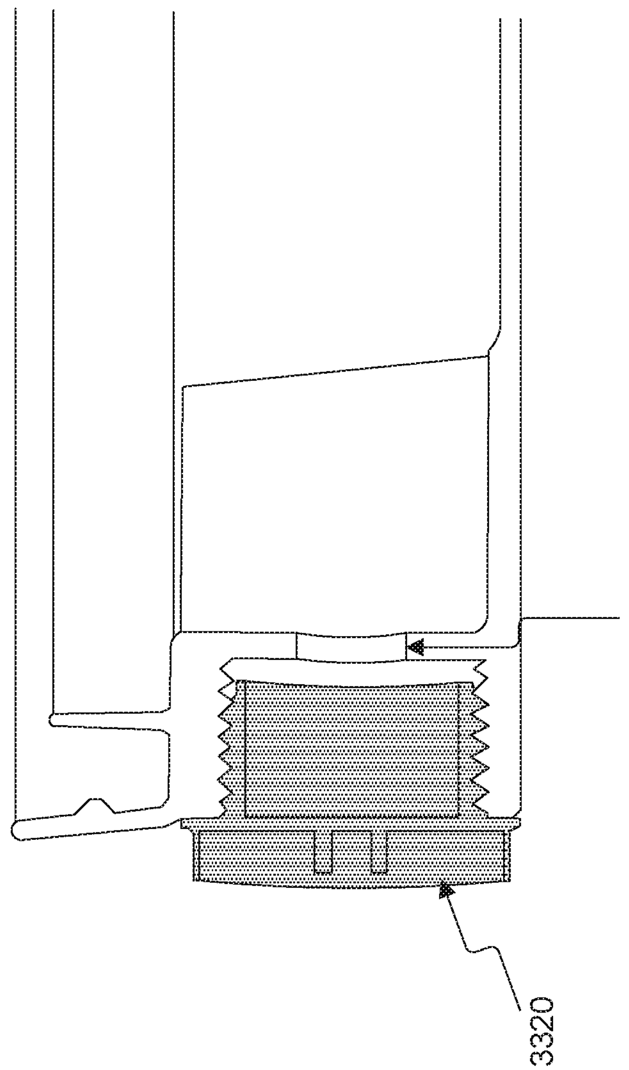
FIG. 33 illustrates a liquid inlet of an animal drinking dispenser apparatus, according to some embodiments of the present disclosure.

Referring now to FIG. 33, a liquid inlet of an animal drinking dispenser apparatus 3300, according to some embodiments of the present disclosure, is illustrated. In some embodiments, the liquid inlet 3310 may be configured to provide an opening from an exterior facing side to the interior facing side of the animal drinking dispenser apparatus 3300, wherein liquids may be added to the liquid inlet 3310 to fill a housing connected to the animal drinking dispenser apparatus 3300.

In some embodiments, the liquid inlet 3310 may connect to a liquid filling device, wherein the liquid filling device may provide liquids through the liquid inlet 3310 into the housing. By way of example and not limitation, the liquid filling device may include a hose or liquid container, as non-limiting examples. In some aspects, the liquid inlet 3310 may include a threaded interior, wherein the threaded interior of the liquid inlet may receive a threaded exterior of a liquid filling device. For example, the liquid filling device may include a hose, wherein the threaded exterior of the hose may be secured into the threaded interior of the liquid inlet 3310, wherein the hose may be configured to fill the housing with water.

In some embodiments, a capping mechanism 3320 may be removably coupled to the liquid inlet 3310. In some aspects, the capping mechanism 3320 may be connected to the liquid inlet 3310 to close off the opening once the liquid may have filled the housing. By way of example and not limitation, the capping mechanism 3320 may be removed from the animal drinking dispenser apparatus 3300, wherein the liquid filling device may be connected to add liquid into the housing and when the housing may be adequately filled, the liquid filling device may be removed and replaced with the capping mechanism 3320.

Figure 34:
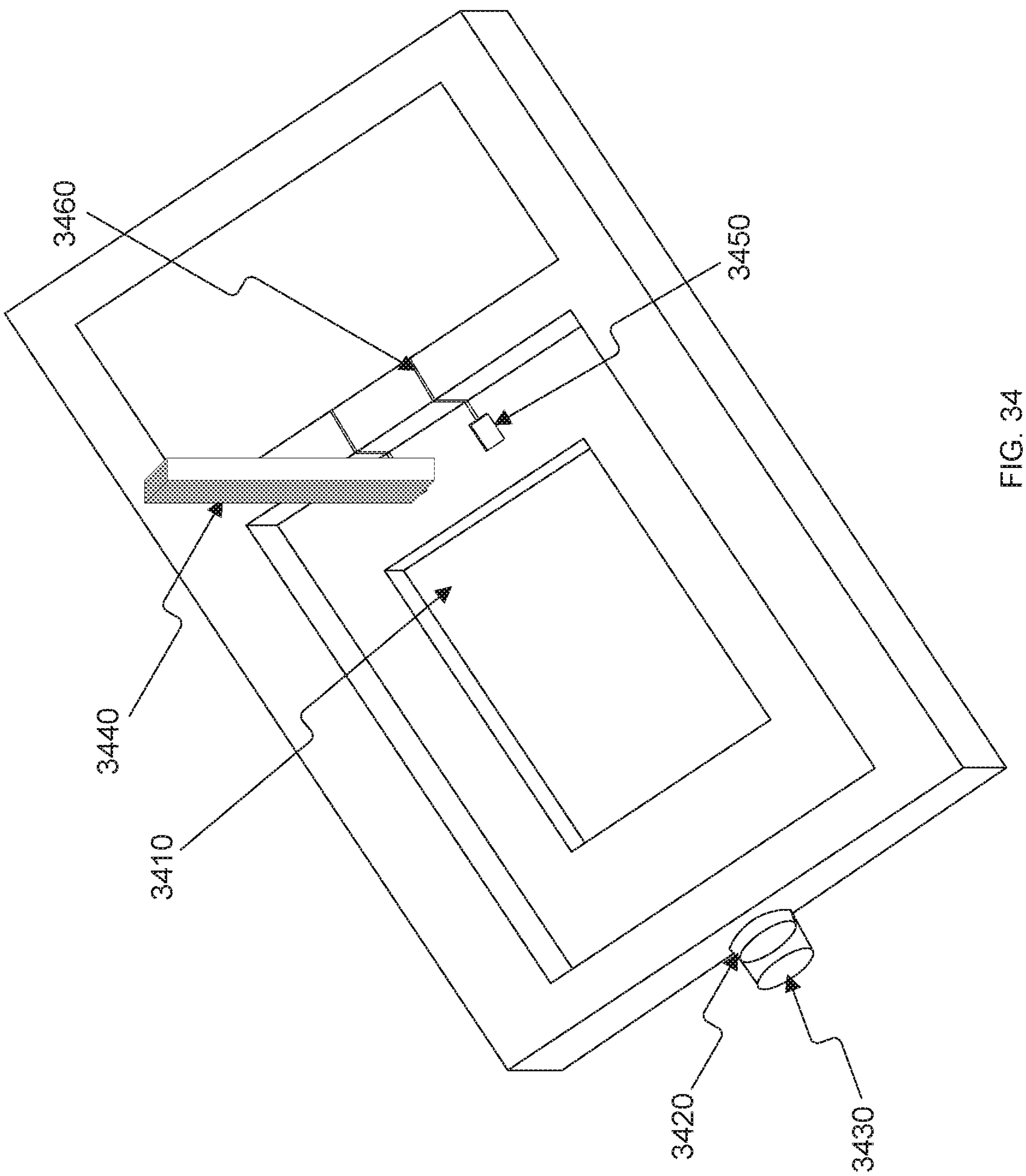
FIG. 34 illustrates an animal drinking dispenser apparatus, according to some embodiments of the present disclosure.

Referring now to FIG. 34, an animal drinking dispenser apparatus 3400, according to some embodiments of the present disclosure, is disclosed. In some embodiments, the animal drink dispenser apparatus 3400 may be configured to attach to a housing capable of storing a volume of fluid. In some aspects, the animal drink dispensing apparatus 3400 may be a substantially rigid, rectangular structure. In some implementations, the animal drink dispenser apparatus 3400 may include an interior facing side and an exterior facing side, wherein the interior facing side may include two parallel inner and outer ridges configured to attach to the housing.

In some embodiments, the animal drink dispenser apparatus 3400 may include a bottom tray 3410, a liquid inlet 3420, a capping mechanism 3430, and a vent apparatus 3440. In some implementations, the animal drink dispenser apparatus 3400 may include one or more vent receiving apertures 3450 and one or more dispensing slots 3460. In some embodiments, each of the one or more dispensing slots 3460 may be paired with one or more vent receiving apertures 3450. In some aspects, the animal drink dispenser apparatus 3400 may include one or more vent apparatus 3450 that may be secured into each of the one or more vent receiving apertures 3450, wherein air and liquids may travel through the one or more vent receiving apertures 3450 through the one or more dispensing slots 3460.

By way of example and not limitation, the animal drink dispenser apparatus 3400 may be attached to a housing configured to store fluids, wherein the fluids in the housing may travel through the vent apparatus 3440 to provide water for animals. In some aspects, the animals may include farm animals, livestock, and horses, as non-limiting examples. In some implementations, the animal drink dispenser apparatus 3400 may come in a variety of shapes and sizes, wherein each of the shape and size may include a liquid inlet 3410 connectable to a hose, wherein the hose may be configured to automatically supply fluids into the housing.

Therefore, the animal drink dispenser apparatus of the present disclosure dispenses liquids to a trough in a self-regulated manner. The drink dispenser apparatus controllably dispenses liquids with non-moving parts, thereby being easy to assemble or dissemble and energy efficient. The drink dispenser apparatus also dispenses liquids in regulated quantities such that minimal amounts of liquids remain stagnant in the trough, thereby reducing the risk of contamination. A non-limiting list of advantages of the drink dispenser apparatus may include affordability, simple construction and configuration, portability and modularity, and improved sanitation through regulated dispensation of liquids, enabling flow of water therethrough with no use of moving parts, and minimal maintenance requirements.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

Reference in this specification to "one embodiment," "an embodiment," any other phrase mentioning the word "embodiment", "aspect", or "implementation" means that a particular feature, structure, or characteristic described in connection with the embodiment is included in at least one embodiment of the disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional.

Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

What is claimed is:

1. An animal drink dispenser apparatus configured to removably attach to a housing capable of storing a volume of fluid, wherein the housing is configured with a single liquid inlet defined by a continuous rim positioned opposite a rigid upper end wall portion of the housing, wherein the animal drink dispenser comprises a substantially rigid circular body having:

- an interior facing side and an exterior facing side, wherein the interior facing side includes two concentric ridges, defined as an inner ridge and an outer ridge, forming a channel configured to receive the continuous rim of the housing to form a seal;
- a bottom tray extending through the body configured to hold an exposed supply of the fluids;
- a liquid inlet extending through the body, wherein the liquid inlet includes a threaded interior configured to receive the supply of liquid to be stored in the housing;
- a capping mechanism configured to attach and detach from the liquid inlet; and
- a vent apparatus positioned on the body adapted to equalize a pressure in a volume of air above the liquid in the housing with ambient air, wherein the vent apparatus is a hollow tube extending from the exterior facing side through the body to the interior facing side.

2. The animal drink dispenser apparatus of claim 1, wherein the bottom tray includes raised walls that are configured to hold liquids entering the bottom tray from the vent apparatus.

3. The animal drink dispenser apparatus of claim 1, wherein the liquid inlet is configured to receive a liquid filling device, wherein the liquid filling device includes a threaded exterior configured to connect to the liquid inlet, wherein the liquid filling device provides water through the liquid inlet.

4. The animal drink dispenser apparatus of claim 3, wherein the liquid filling device is a hose and the hose is configured to provide water through the liquid inlet.

5. The animal drink dispenser apparatus of claim 1, wherein the vent apparatus includes an upper end and an open lower end of a passageway within the vent apparatus.

6. The animal drink dispenser apparatus of claim 5, wherein the open lower end connects to at least one vent receiving aperture, wherein the vent receiving aperture is connected with one or more dispensing slots on the bottom tray, wherein the liquid is expelled from the one or more dispensing slots into the bottom tray.

7. The animal drink dispenser apparatus of claim 1, wherein the capping mechanism is configured to remain connected to the liquid inlet, wherein the capping mechanism is configured to be removed from the liquid inlet when liquid is to be added.

8. The animal drink dispenser apparatus of claim 1, wherein the animal drink dispenser apparatus is self-cleaning, wherein when the volume of liquid enters the vent apparatus, the liquids travel down the vent apparatus and spray out onto the bottom tray.

9. The animal drink dispenser apparatus of claim 1, wherein the housing is a bucket capable of storing a volume of liquid.

10. The animal drink dispenser apparatus of claim 1, wherein the vent apparatus is connected to the interior facing side of the substantially rigid circular body.

11. The animal drink dispenser apparatus of claim 1, wherein the vent apparatus allows the volume of air in the housing to be pushed out therethrough to the ambient air when said housing is being refilled through the liquid inlet such that the volume of air is prevented from pressurizing.

12. The animal drink dispenser apparatus of claim 1, wherein the bottom tray is collapsable, wherein the bottom tray folds into the animal drink dispenser apparatus of claim 1.

13. An animal drink dispenser apparatus configured to attach to a housing capable of storing a volume of fluid, wherein the housing is configured with a single liquid inlet defined by a continuous rim connected to a rigid upper end wall portion by a rigid, continuously curvilinear sidewall portion of the housing, wherein the animal drink dispenser comprises a substantially rigid body including:

- an interior facing side and an exterior facing side, wherein the interior facing side includes two parallel ridges, defined as an inner ridge and an outer ridge configured to attach to the continuous rim of the housing;
- a bottom tray extending from the body and configured to hold an exposed supply of the fluids;
- a liquid inlet opposite of the bottom tray, wherein the liquid inlet includes a threaded interior configured to receive the supply of liquid to be stored in the housing;
- a capping mechanism configured to attach and detach from the liquid inlet;
- a vent apparatus positioned within the interior facing side adapted to equalize a pressure in a volume of air above the liquid in the housing, which pressure is reduced when the liquid is dispensed to the bottom tray, with ambient air, wherein the vent apparatus is a hollow tube.

14. The animal drink dispenser apparatus of claim 13, wherein the liquid inlet is configured to attach to a hose.

15. The animal drink dispenser apparatus of claim 13, wherein the bottom tray includes raised walls that are configured to hold liquids entering the bottom tray from the vent apparatus.

16. The animal drink dispenser apparatus of claim 13, wherein the capping mechanism is configured to remain connected to the liquid inlet, wherein the capping mechanism is configured to be removed from the liquid inlet when liquid is to be added.

17. The animal drink dispenser apparatus of claim 13, wherein the vent apparatus is connected to the interior facing side of the substantially rigid circular body.

18. The animal drink dispenser apparatus of claim 13, wherein the vent apparatus includes an upper end and an open lower end of a passageway within the vent apparatus.

* * * * *